United States Patent [19]

Kimura et al.

[11] Patent Number: 4,533,233
[45] Date of Patent: Aug. 6, 1985

[54] ELECTROSTATIC COPYING APPARATUS

[75] Inventors: Hiroshi Kimura, Habikino; Masahiko Hisajima; Kiyoshi Shibata, both of Osaka; Yoichiro Irie, Suita; Kiyoshi Morimoto, Osaka; Takashi Nagashima, Sakai; Yasuhiko Yoshikawa, Ikoma; Kiyonori Yamamoto, Neyagawa; Masahiro Watashi, Ikoma; Shinsuke Yoshinaga, Sakai; Toshihiko Yamamoto, Takaishi, all of Japan

[73] Assignee: Mita Industrial Co., Ltd., Osaka, Japan

[21] Appl. No.: 485,082

[22] Filed: Apr. 14, 1983

[30] Foreign Application Priority Data

Apr. 20, 1982 [JP] Japan ............................ 57-64664

[51] Int. Cl.³ ............................................. G03G 15/28
[52] U.S. Cl. ................................. 355/8; 355/55; 355/56; 355/58; 355/66
[58] Field of Search ............... 355/8, 55, 56, 58, 66

[56] References Cited

U.S. PATENT DOCUMENTS

| 3,819,998 | 6/1974 | Yole | 318/375 X |
|---|---|---|---|
| 3,884,574 | 5/1975 | Doi et al. | 355/66 |
| 4,118,118 | 10/1978 | Barto, Jr. | 355/55 X |
| 4,125,323 | 11/1978 | Ikeda et al. | 355/8 |
| 4,126,389 | 11/1978 | Ikeda et al. | 355/55 X |
| 4,168,905 | 9/1979 | Kitajima | 355/8 X |
| 4,209,248 | 6/1980 | Gibson et al. | 355/58 X |
| 4,246,525 | 1/1981 | Coppola | 318/373 X |
| 4,367,945 | 1/1983 | Abe | 355/8 X |
| 4,372,676 | 2/1983 | Miyata et al. | 355/55 X |
| 4,436,416 | 3/1984 | Negoro et al. | 355/8 X |

Primary Examiner—William M. Shoop, Jr.
Assistant Examiner—Shik Luen Paul Ip
Attorney, Agent, or Firm—Beveridge, DeGrandi & Weilacher

[57] ABSTRACT

A variable magnification electrostatic copying apparatus comprising a transparent plate on which to place a document to be copied, an optical system for projecting the image of the document onto an electrostatographic photosensitive member at any desired projecting ratio selected from a plurality of projecting ratios in an exposure zone located along the moving path of the photosensitive member, and a driving means for moving at least a part of the optical system and the transparent plate relative to each other. The optical system includes at least one position-variable optical element assembly adapted to be held at any of a plurality of positions corresponding to the aforesaid plurality of projecting ratios. The variable magnification electrostatic copying apparatus includes a unique improved means for varying the projecting ratio of the optical system by moving the position-variable optical element assembly.

31 Claims, 11 Drawing Figures

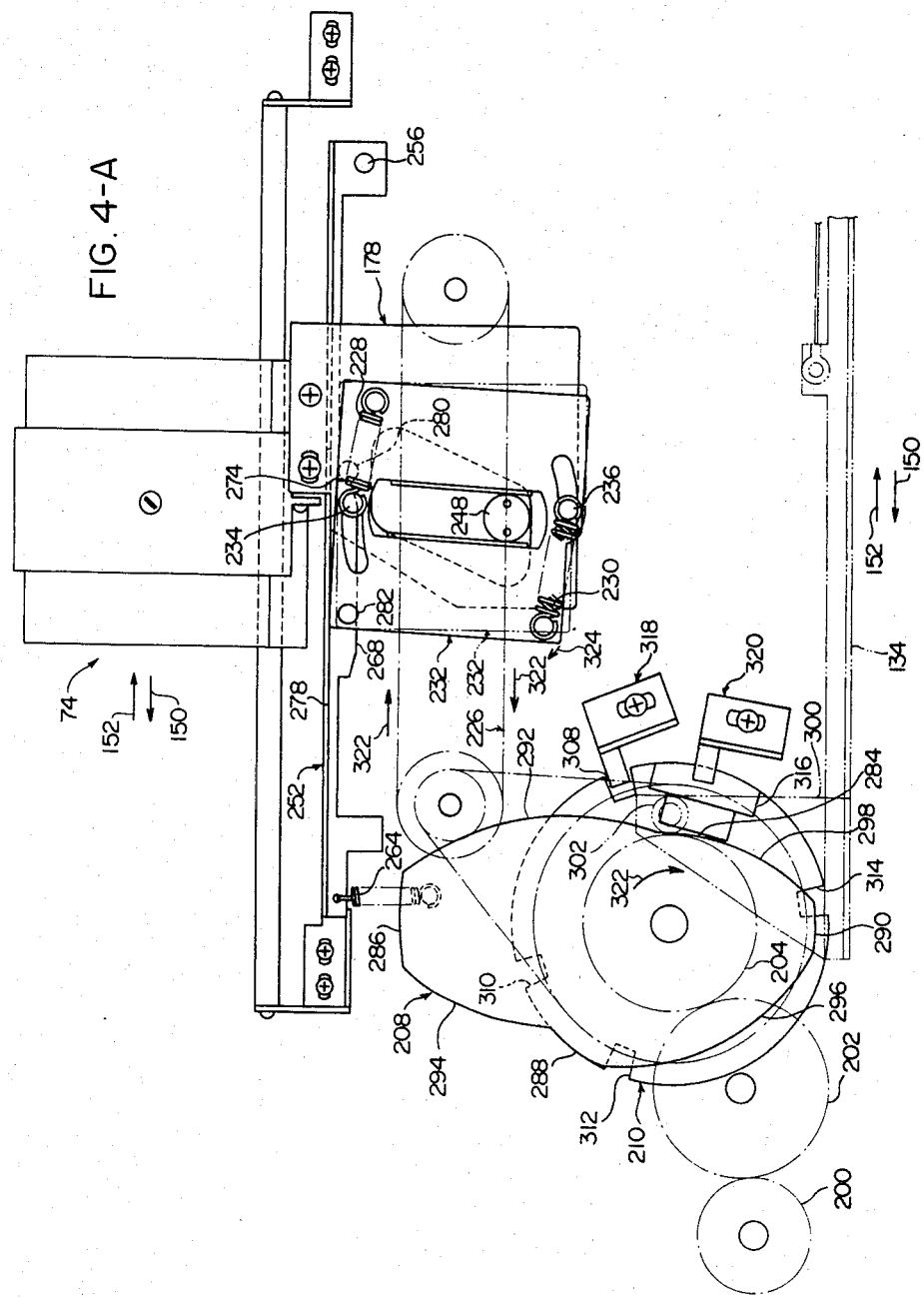

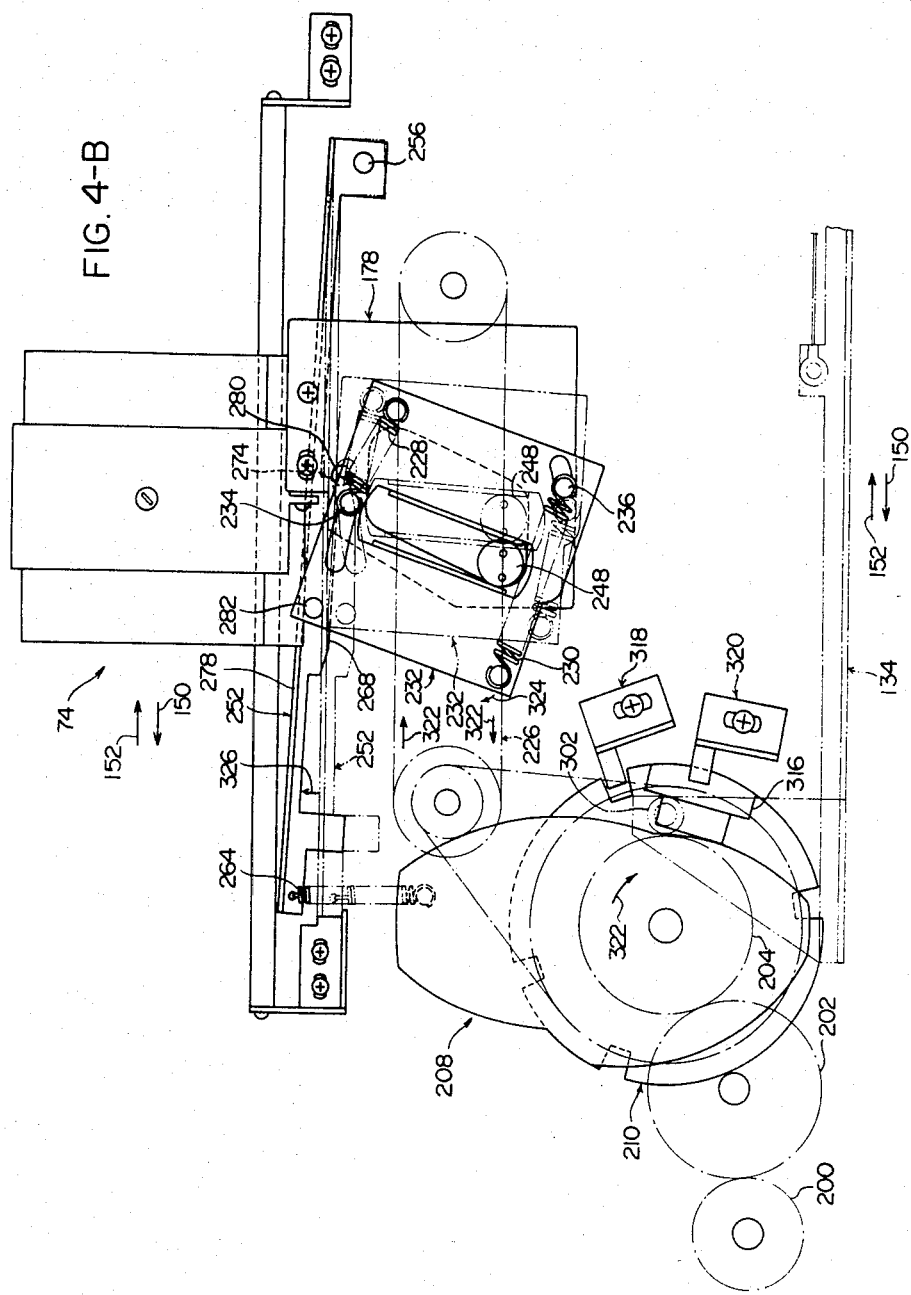

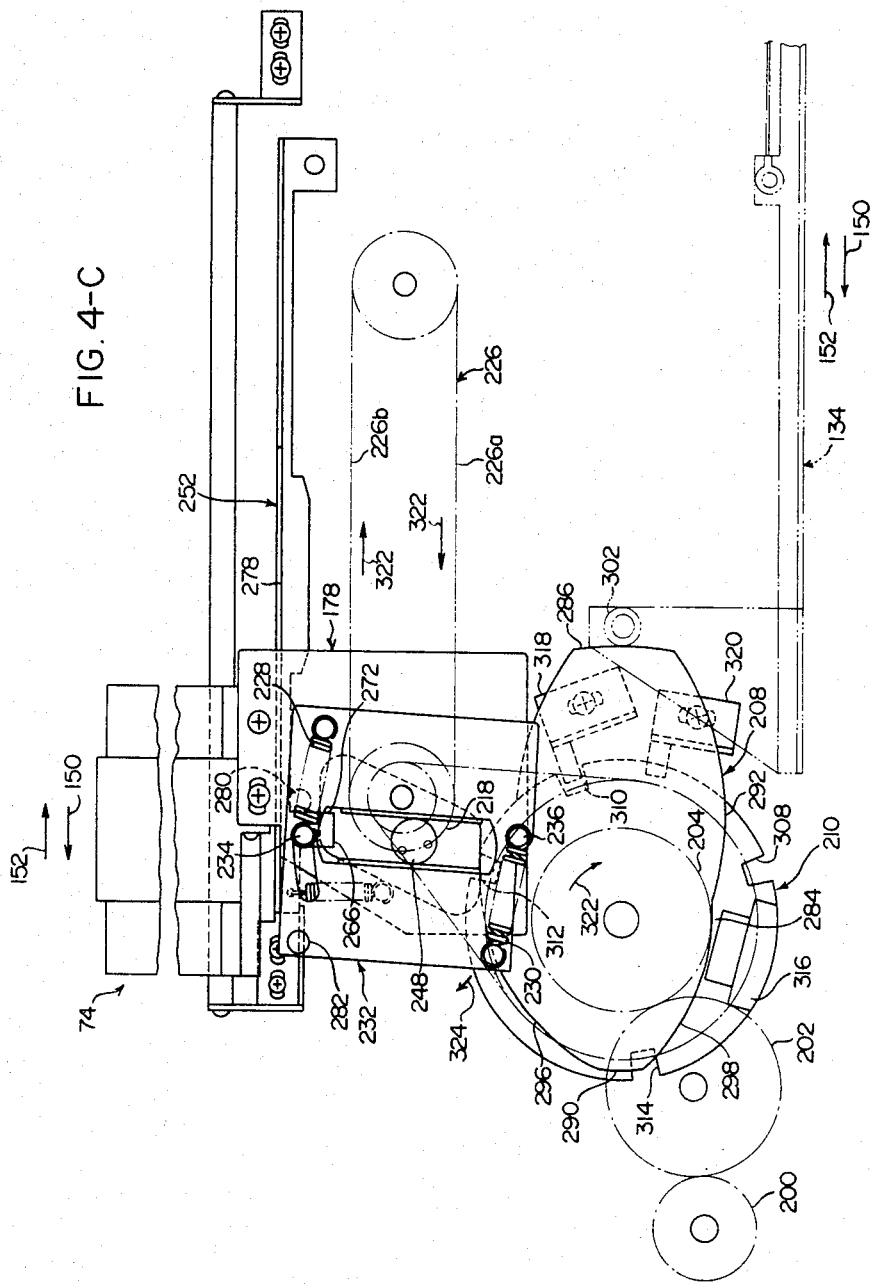

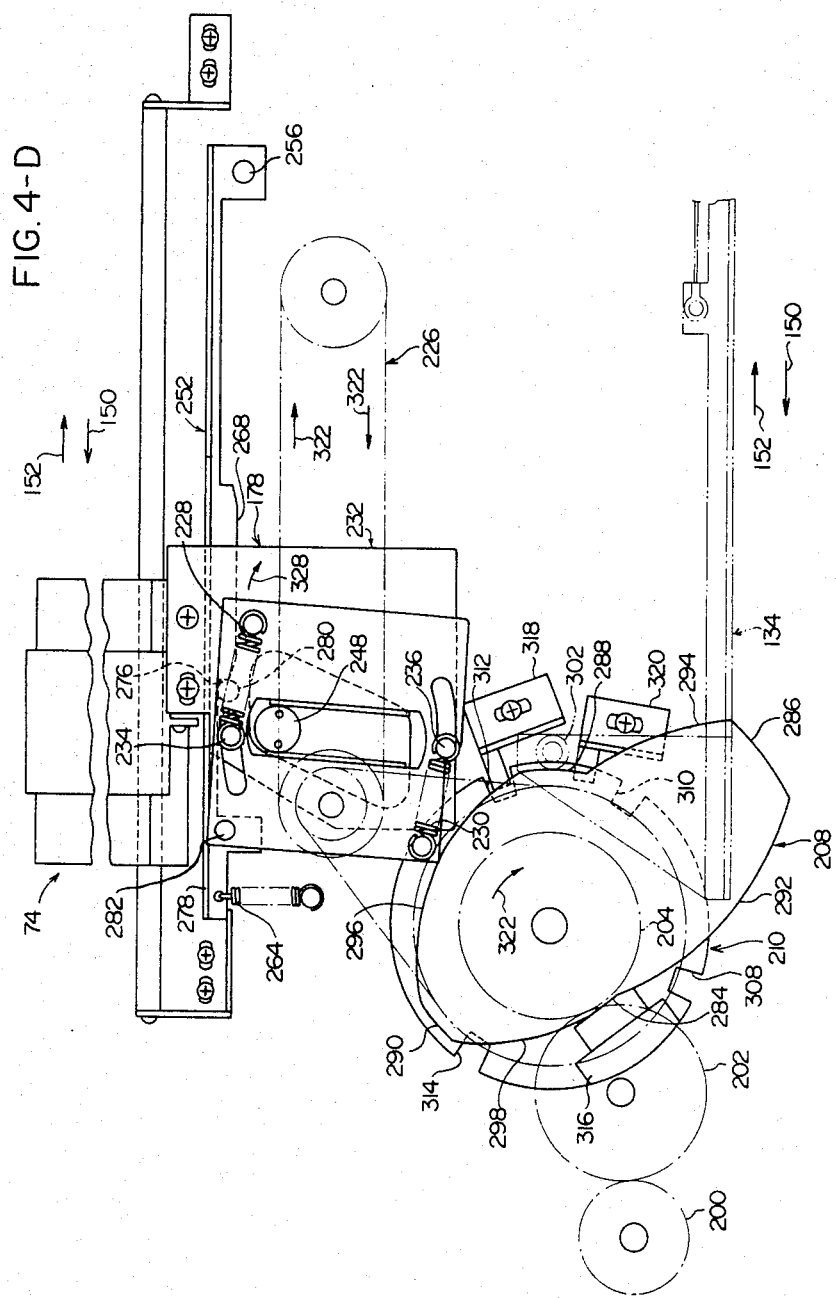

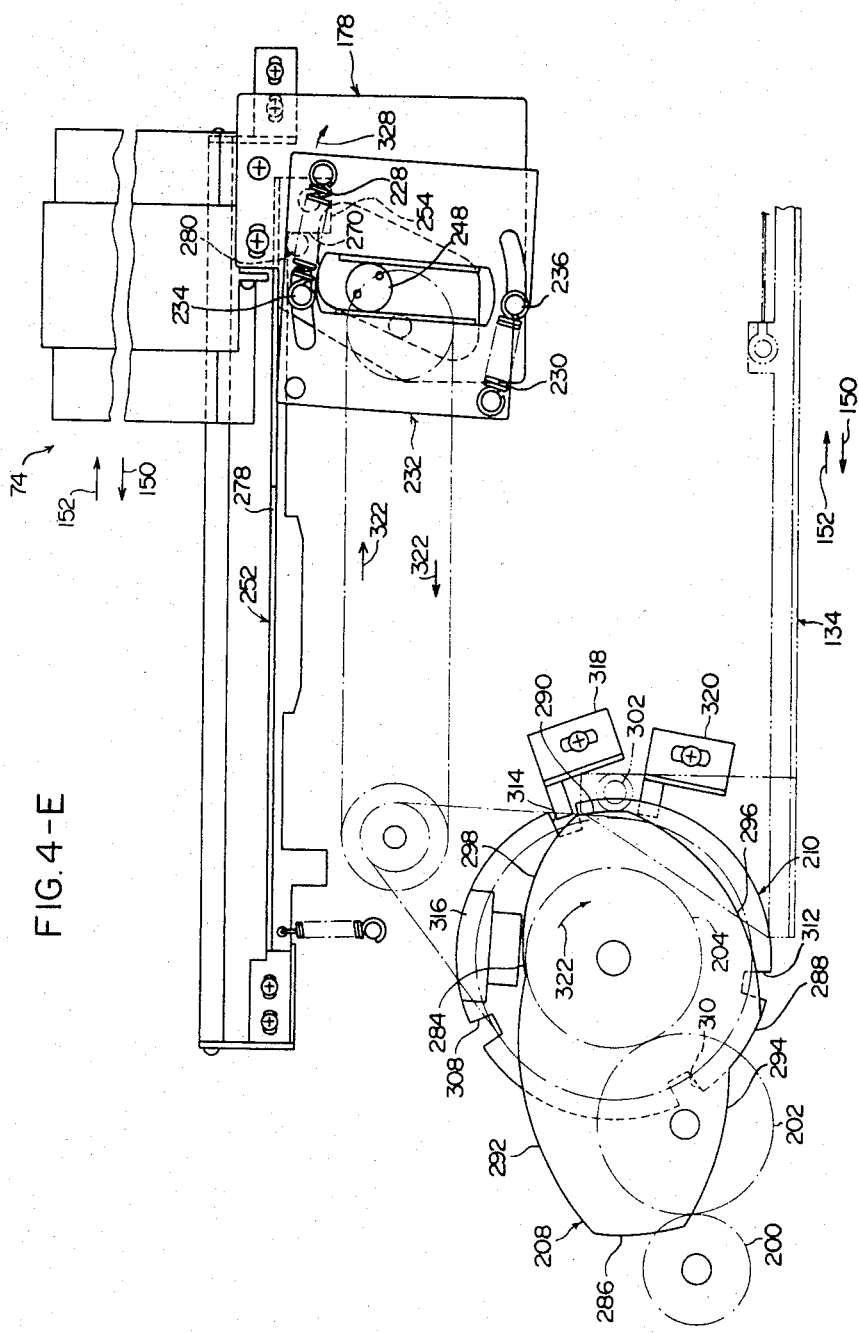
FIG.4-E

ELECTROSTATIC COPYING APPARATUS

FIELD OF THE INVENTION

This invention relates to an electrostatic copying apparatus, and more specifically, to a variable magnification electrostatic copying apparatus capable of producing copies at any of a plurality of magnification ratios.

DESCRIPTION OF THE PRIOR ART

Variable magnification electrostatic copying apparatuses capable of producing copies of a document at a desired magnification ratio selected from a plurality of magnification ratios, for example a 1:1 ratio or on a reduced or enlarged scale at a given magnification ratio, have been proposed and come into commercial acceptance.

Such a variable magnification electrostatic copying apparatus generally has an optical system capable of projecting the image of a document placed on a transparent plate at a selected projecting ratio on a photosensitive member in an exposure zone along the moving path of the photosensitive member. The copying magnification can generally be varied by changing the projecting ratio of the optical system and the speed of scanning exposure which is carried out by moving at least a part of the optical system and the transparent plate relative to each other. The projecting ratio of the optical system can be changed by changing the position of at least one optical element assembly of the optical system. When the optical system is of the type which includes a first reflecting mirror assembly, a second reflecting mirror assembly and a lens assembly and in which at the time of scanning exposure, the first reflecting mirror assembly is moved along the stationary transparent plate and in synchronism with the movement of the first reflecting mirror assembly, the second reflecting mirror assembly is moved at a speed one-half of that of the first reflecting mirror assembly, the projecting ratio of the optical system can be changed by changing the position of the lens assembly and the position of the second reflecting mirror assembly with respect to the first reflecting mirror assembly.

However, the conventional variable magnification electrostatic copying apparatuses have problems or defects which have to be overcome. For example, (a) when the optical system is of the aforesaid type, means for changing the projecting ratio of the optical system by moving the optical element assemblies, i.e. the lens assembly and the second reflecting mirror assembly is relatively complex and costs high; and (b) the optical element assemblies, particularly the lens assembly and the second reflecting mirror assembly in the optical system of the aforesaid type, whose position is to be changed for changing the projecting ratio of the optical system, cannot be held at a required position fully accurately and stably. Furthermore, in electrostatic copying apparatuses in general not restricted to those having the function of performing variable magnification copying, it is important that at least a part of the optical system or the transparent plate which is to be moved for scanning exposure should be accurately held at a specified position, namely a forward movement start position, after the required movement. In the conventional electrostatic copying apparatuses, there is a tendency that at least a part of the optical system or the transparent plate cannot be held at a specified start-of-forward movement position fully accurately and stably. This tendency is especially pronounced when the apparatus is operated continuously over a long period of time.

SUMMARY OF THE INVENTION

It is a primary object of this invention therefore to provide an improved variable magnification electrostatic copying apparatus equipped with an optical system of the aforesaid type in which means for changing the projecting ratio of the optical system by moving optical element assemblies, i.e. a lens assembly and a second reflecting mirror assembly, as required has sufficient reliability and yet is relatively simple and costs low.

Another object of this invention is to provide an improved variable magnification electrostatic copying apparatus in which optical element assemblies, specifically a lens assembly and a second reflecting mirror assembly in the case of an optical system of the aforesaid type, whose position is to be changed by changing the projecting ratio of the optical system, can be held at a required position fully accurately and stably.

Still another object of this invention is to provide an improved electrostatic copying apparatus in which at least a part of an optical system or a transparent plate to be moved for scanning exposure can be held at a specified forward movement start position fully accurately and stably after its required movement.

Further objects of this invention will become apparent from the following description made with reference to the accompanying drawings.

BRIEF DESCRIPTION OF THE DRAWINGS

FIGS. 4-A, 4-B, 4-C, 4-D and 4-E are partial simplified views for illustrating the action of the means for changing the projecting ratio of the optical system;

DETAILED DESCRIPTION OF THE PREFERRED EMBODIMENTS

Figure 1:
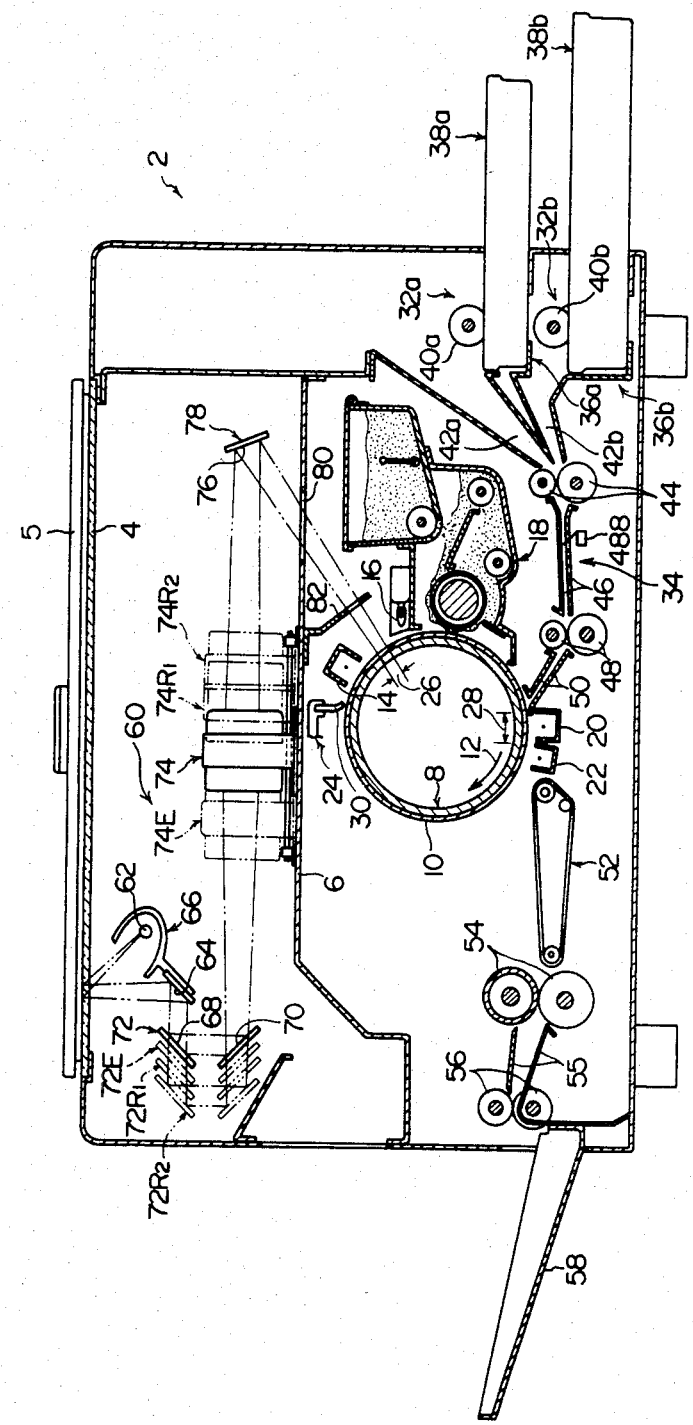
FIG. 1 is a simplified sectional view showing one embodiment in its entirety of the variable magnification electrostatic copying apparatus constructed in accordance with this invention.

The invention is described below in detail with reference to the accompanying drawings showing the preferred embodiments of the variable magnification electrostatic copying apparatus of the invention.

General Structure of the Copying Apparatus

The general structure of the variable magnification copying apparatus of this invention is first described with reference to FIG. 1 which illustrates in a simplified form the entire view of one embodiment of the electrostatic copying apparatus of this invention.

The illustrated copying apparatus has a nearly rectangular housing shown generally at 2. A stationary transparent plate 4 on which to place a document to be copied is fixed to the upper surface of the housing 2, and an openable and closable document presser 5 for covering the transparent plate 4 and a document placed thereon is provided on the top surface of the housing 2.

Within the housing 2 is provided a base plate 6 most of which extends substantially horizontally within the housing 2 to divide the inside of the housing 2 into an upper space and a lower space. A cylindrical rotating drum 8 is rotatably mounted nearly centrally in the lower space. An electrostatographic photosensitive material 10 is disposed on at least a part of the peripheral surface of the rotating drum 8.

Around the rotating drum 8 to be rotated in the direction of an arrow 12 are disposed a charging corona discharge device 14, a charge eliminating lamp 16, a developing device 18, a transferring corona discharge device 20, a peeling corona discharge device 22 and a cleaning device 24 in this order in the rotating direction of the rotating drum 8. The charging corona discharge device 14 substantially uniformly charges the photosensitive member 10 to a specified polarity. An exposure zone 26 exists between the charging corona discharge device 14 and the charge eliminating lamp 16. In the exposure zone 26, the image of a document placed on the transparent plate 4 is projected onto the photosensitive member 10 by an optical system to be described, thereby forming a latent electrostatic image corresponding to the image of the document. The charge eliminating lamp 16, in a reduced scale copying mode, etc., illuminates the two side portions of the photosensitive member 10 (the two side portions viewed in the direction of the central axis of rotation of the rotating drum 8) which have been charged by the charging corona discharge device 14 but onto which the image of the document has not been projected in the exposure zone 26, thereby removing the charge on the aforesaid two side portions. The developing device 18 applies toner particles to the latent electrostatic image formed on the photosensitive member 10 to develop it into a toner image. The transferring corona discharge device 20 applies corona discharge to the back of a copying paper kept in contact with the surface of the photosensitive member 10 in a transfer zone 28 to transfer the toner image on the photosensitive member 10 to the copying paper. The peeling corona discharge device 22 applies corona discharge to the back of the copying paper immediately downstream of the transfer zone 28 to peel the copying paper from the surface of the photosensitive member 10 to which it adheres electrostatically. The cleaning device 24 has a blade 30 made of an elastic material capable of being pressed against the surface of the photosensitive member 10, and by the action of the blade 30, residual toner particles on the photosensitive member 10 are removed. If desired, a charge eliminating lamp and a charge-eliminating corona discharge device (not shown) for removing residual charges which will remain on the photosensitive member 10 after transfer may be additionally provided in a zone between the peeling corona discharge device 22 and the cleaning device 24 in the rotating direction of the rotating drum 8 as shown by arrow 12.

In the lower portion of the housing 2, there are provided two paper feed mechanisms 32a and 32b placed side by side in the vertical direction and a paper conveying mechanism shown generally at 34 for conveying a copying paper fed from the paper feed mechanisms 32a and 32b through the transfer zone 28. The paper feed mechanisms 32a and 32b respectively have cassette-receiving sections 36a and 36b, paper cassettes 38a and 38b to be mounted detachably on the cassette-receiving sections 36a and 36b through openings formed in the right-side wall of the housing 2, and delivery rollers 40a and 40b. One of the delivery rollers 40a and 40b is selectively actuated to deliver copying papers one by one from a plurality of sheet-like copying papers stacked in the paper cassette 38a or 38b to the paper conveying mechanism 34 through a delivery passage 42a or 42b. The paper feed mechanism 34 includes a carrying roller unit 44, a guide plate unit 46 and a conveying roller unit 48 for conveying the paper delivered through the delivery passage 42a or 42b, a guide plate unit 50 for conducting the copying paper from the conveyor roller unit 48 to the transfer zone 28, a conveying belt assembly 52 for conveying the copying paper peeled from the photosensitive member 10, a fixing roller unit 54, a guide plate unit 55, a discharge roller unit 56 and a receiving tray 58 for receiving the copying paper discharged from the discharge roller unit 56 through an opening formed in the left-side wall of the housing 2. A set of rollers in the fixing roller unit 54 which are located in an upper portion thereof have a heating element (not shown) inside, and press and heat the surface of the copying paper having the toner image transferred from the photosensitive member 10, thereby fixing the toner image to the copying paper.

An optical system shown generally at 60 for projecting the image of a document placed on the transparent plate 4 onto the photosensitive member 10 in the exposure zone 26 is provided in the upper space of the housing 2 above the base plate 6. This optical system 60 is comprised of a first reflecting mirror assembly 66 having a document illuminating lamp 62 and a reflecing mirror 64, a second reflecting mirror assembly 72 having two reflecting mirrors 68 and 70, a lens assembly 74 having at least one lens, and a third reflecting mirror assembly 78 having a reflecting mirror 76. As stated in detail hereinafter, the first reflecting mirror assembly 66 is reciprocated in the left and right directions in FIG. 1 along the transparent plate 4. The second reflecting mirror assembly 72 is reciprocated in the left and right directions in FIG. 1 in synchronism with the reciprocation of the first reflecting mirror assembly 66 substantially parallel to the reciprocating direction of the first reflecting mirror assembly 66 at a speed one-half of the moving speed of the first reflecting mirror assembly 66. When the first reflecting mirror assembly 66 and the second reflecting mirror assembly 72 move forwardly from left to right in FIG. 1, the document placed on the transparent plate 4 is scanned, and the image of the document is projected onto the photosensitive member 10 in the exposure zone 26. The reflected light from the document illuminated by the document illuminating lamp 62 is reflected by the reflecting mirrors 64, 68 and 70, passes through the lens of the lens assembly 74, thereafter is reflected by the reflecting mirror 76, passes through an opening 80 formed in the base plate 6, and finally arrives at the photosensitive member 10 in the exposure zone 26. Between the opening 80 and the photosensitive member 10 is disposed a slit exposure width-restricting member 82 for restricting the slit exposure width which is the width of a light path leading to the photosensitive member 10 in the moving direction of the photosensitive member 10 (i.e., in the rotating direction of the rotating drum 8 shown by arrow 12).

The illustrated copying apparatus is constructed such that copies can be produced at a magnification ratio selected from four magnification ratios, i.e. a 1:1 ratio copying, a first reduced copying shown by a length ratio of about 0.82 and an area ratio of about 0.67, a second reduced copying shown by a length ratio of about 0.7 and an area ratio of about 0.5, and an enlarged copying shown by a length ratio of about 1.27 and an area ratio of about 1.6.

In the case of the 1:1 ratio copying, the lens assembly 74 of the optical system 60 is held at a position shown by a solid line in FIG. 1, and the second reflecting mirror assembly 72 is held at a position shown by a solid line in FIG. 1 at the start of forward movement. Thus, the optical system 60 is in condition for projecting the image of a document at a ratio of 1:1 onto the photosensitive member 10. When the optical system 60 projects the image of the document onto the photosensitive member 10, the first reflecting mirror assembly 66 is moved forwardly at a speed V substantially equal to the moving speed of the photosensitive member 10, and the second reflecting mirror assembly 72 is moved forward at a speed of V/2.

In the case of the first reduced copying mentioned above, the lens assembly 74 of the optical system 60 is held at a first reduction position shown by a two-dot chain line $74R_1$ in FIG. 1, and the second reflecting mirror assembly 72 is held at a first reduction position shown by a tow-dot chain line $72R_1$ in FIG. 1 at the start of its forward movement. Thus, the optical system 60 is in condition for projecting the image of the document at a ratio of about 0.82 onto the photosensitive member 10 (whereby the size of a latent electrostatic image formed on the photosensitive member 10 in the widthwise direction is reduced to about 0.82 times the actual size of the document). When the image of the document is projected onto the photosensitive member 10, the first reflecting mirror assembly 66 is moved at a speed of about V/0.82, and the second reflecting mirror assembly 72 is moved at a speed of about V/(2×0.82) (whereby the size of a latent electrostatic image formed on the photosensitive member 10 in the moving direction of the photosensitive member 10, namely in the scan exposure moving direction, is reduced to about 0.82 times the actual size of the document).

In the case of the second reduced copying, the lens assembly 74 of the optical system 60 is held at a second reduction position shown by a two-dot chain line $74R_2$ in FIG. 1, and the second reflecting mirror assembly 72 is held at a second reduction position shown by a two-dot chain line $72R_2$ in FIG. 1 at the start of its forward movement. Thus, the optical system 60 is in condition for projecting the image of the document at a magnification ratio of about 0.7 onto the photosensitive member 10 (whereby the size of a latent electrostatic image formed on the photosensitive member 10 in the widthwise direction is reduced to about 0.7 times the actual size of the document). When the image of the document is projected onto the photosensitive member 10, the first reflecting mirror assembly 66 is moved at a speed of about V/0.7, and the second reflecting mirror assembly 72 is moved at a speed of about V/(2×0.7) (whereby the size of a latent electrostatic image formed on the photosensitive member 10 in the moving direction of the photosensitive member 10, namely the scan exposure moving direction, is reduced to about 0.7 times the actual size of the document).

In the enlarged copying mode, the lens assembly 74 of the optical system 60 is held at an enlargement position shown by a two-dot chain line 74E in FIG. 1, and the second reflecting mirror assembly 72 is held at an enlargement position shown by a tow-dot chain line 72E in FIG. 1 at the start of its forward movement. Thus, the optical system 60 is in condition for projecting the image of the document at a magnification ratio of about 1.27 onto the photosensitive member 10 (whereby the size of a latent electrostatic image formed on the photosensitive member 10 in the widthwise direction is enlarged to about 1.27 times the actual size of the document). When the image of the document is projected onto the photosensitive member 10, the first reflecting mirror assembly 66 is moved at a speed of about V/1.27, and the second reflecting mirror assembly 72, at a speed of about V/(2×1.27) (whereby the size of a latent electrostatic image formed on the photosensitive member 10 in the moving direction of the photosensitive member 10, namely its scan exposure moving direction, is enlarged to about 1.27 times the actual size of the document).

On the other hand, the rotating drum 8 is rotated at a predetermined speed always irrespective of the copying magnification ratio, and thus the photosensitive member 10 is always moved at a speed V. The paper conveying mechanism 34 conveys papers through the transfer zone 28 always at a predetermined speed, i.e. at the same speed as the moving speed of the photosensitive member 10, irrespective of the copying magnification ratio.

The aforesaid structure of the illustrated variable magnification electrostatic copying apparatus has already been known, and only shows one example of variable magnification electrostatic copying machines to which the present invention is applicable.

In the illustrated variable magnification electrostatic copying apparatus, the following improvements have been made in regard to the optical system 60.

First and Second Reflecting Mirror Assemblies

Figure 2:
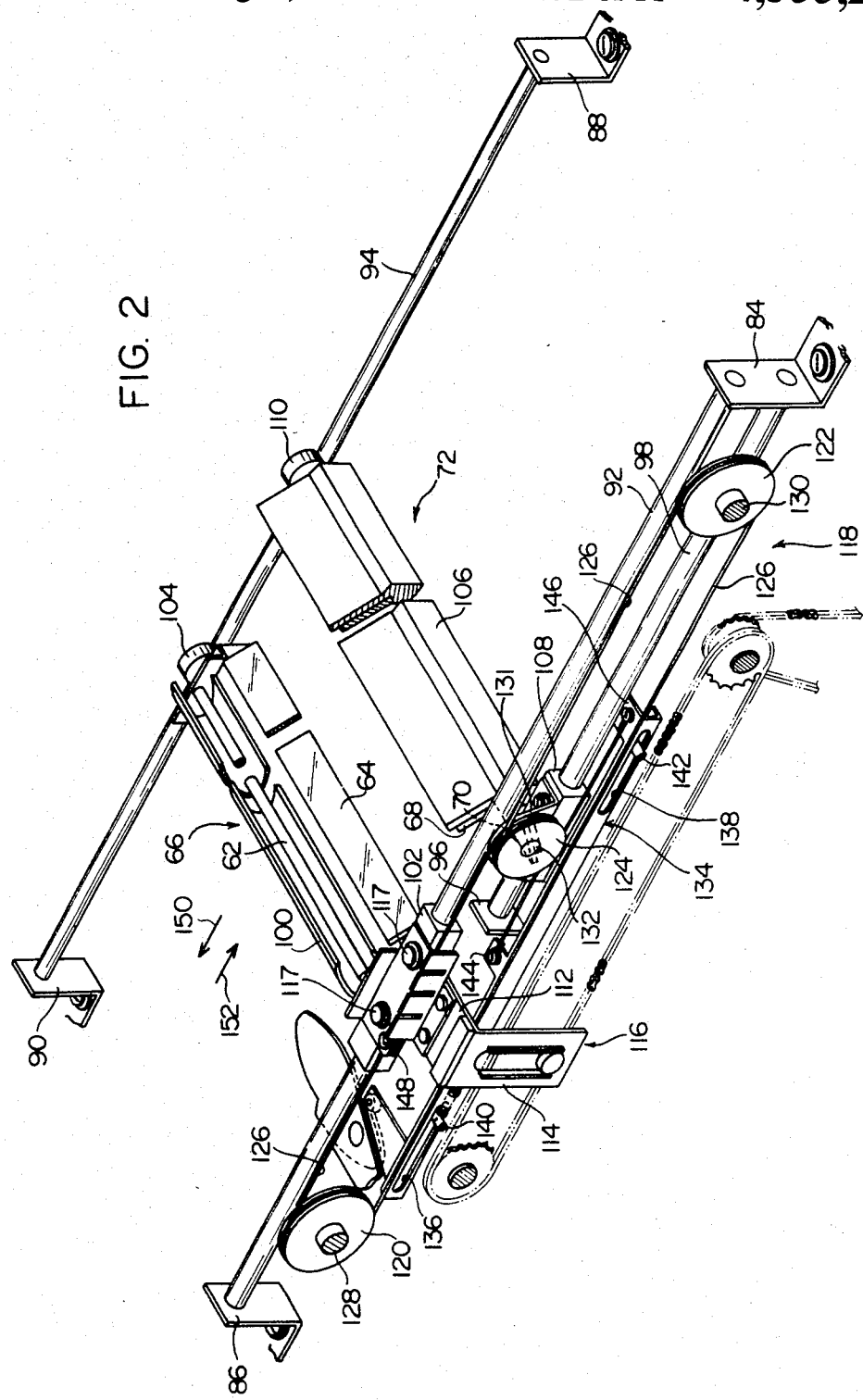
FIG. 2 is a partial perspective view showing a first and a second reflecting mirror assembly of an optical system in the electrostatic cipying apparatus shown in FIG. 1.

With reference to FIG. 2 which is a perspective view seen from the side of a forward movement start position (left side in FIG. 1), which shows the first reflecting mirror assembly 66 and the second reflecting mirror assembly 72 as they have been moved forwardly a considerable distance from the forward movement start positions, a pair of mounting brackets 84 and 86 are fixed in the upper space of the housing 2 above the base plate 6 (FIG. 1) with a space therebetween in the reciprocating directions (the left and right directions in FIG. 1) of the first reflecting mirror assembly 66 and the second reflecting mirror assembly 72. Furthermore, a pair of mounting brackets 88 and 90 are fixed which are spaced from each other in the aforesaid reciprocating directions and also spaced widthwise (in the direction perpendicular to the sheet surface in FIG. 1) from the aforesaid pair of mounting brackets 84 and 86. A suspending rod 92 is fixed between the mounting brackets 84 and 86, and a suspending rod 94, between the mounting brackets 88 and 90. A mounting bracket 96 is fixed substantially midway between the pair of mounting brackets 84 and 86, and a suspending rod 98 is fixed between the mounting brackets 96 and 84.

On the other hand, the first reflecting mirror assembly 66 has a support frame 100 on which the document illuminating lamp 62 and the reflecting mirror 64 are mounted in position. A sliding block 102 is fixed to one end of the support frame 100, and slidably mounted on the suspending rod 92. A roller 104 is rotatably mounted on the other end of the support frame 100 and is also placed on the suspending rod 94. Thus, the first reflecting mirror assembly 66 having the document illuminating lamp 62 and the reflecting mirror 64 is mounted for free sliding along the suspending rods 92 and 94.

The second reflecting mirror assembly 72 also has a support frame 106 to which the reflecting mirror 68 and the reflecting mirror 70 are fixedly secured in position. A sliding block 108 is fixed to one end of the support frame 106, and also slidaly mounted on the suspending rod 98. A roller 110 is rotatably mounted on the other end of the support frame 106, and placed on the suspending rod 94. Thus, the second reflecting mirror assembly 72 having the reflecting mirrors 68 and 70 is mounted for free sliding along the suspending rods 98 and 94.

A driven member 116 having a widthwise protruding horizontal portion 112 and a suspending portion 114 extending downwardly from the protruding end of the horizontal portion 112 is fixed by means of a pair of setscrews 117 to the sliding block 102 fixed to one end of the first reflecting mirror assembly 66. A driving force for reciprocating the first relecting mirror assembly 66 is transmitted to the driven member 116, whereby the first reflecting mirror assembly 66 is reciprocated along the suspending rods 92 and 94, as will be described in detail hereinafter.

Between the first reflecting mirror assembly 66 and the second reflecting mirror assembly 72 is disposed a decelerating interlocking mechanism shown generally at 118 for reciprocating the second reflecting mirror assembly 72 at a speed one-half of the moving speed of the first reflecting mirror assembly 66 in interlocking relation to the reciprocation of the first reflecting mirror assembly 66. The illustrated deceleration interlocking mechanism 118 includes a pair of stationary pulleys 120 and 122, a movable pulley 124, and a rope 126 wrapped about these pulleys 120, 122 and 124. The pair of stationary pulleys 120 and 122 are rotatably mounted on support shafts 128 and 130 which are respectively fitted in an upstanding base plate (not shown) within the housing 2 and are spaced from each other in the reciprocating directions of the first reflecting mirror assembly 66 and the second reflecting mirror assembly 72. On the other hand, the movable pulley 124 is rotatably mounted on a support shaft 132 fitted in a bracket 131 fixed to the sliding block 108 which in turn is fixed to one end of the support frame 106 of the second reflecting mirror 72. In the illustrated embodiment, an elongated setting member 134 extending in the reciprocating directions of the first reflecting mirror assembly 66 and the second reflecting mirror 72 is provided in relation to the deceleration interlocking mechanism 118 including the pair of stationary pulleys 120 and 122, the movable pulley 124 and the rope 126. Slots 136 and 138 extending in the aforesaid reciprocating directions are formed in the opposite end portions of the setting member 134, and support shafts 140 and 142 provided in the aforesaid upstanding base plate (not shown) are received respectively in the slots 136 and 138. Thus, the setting member 134 is mounted movably in the receiprocating directions. As will be described in detail hereinafter, the setting member 134 is adapted to be selectively held at any of four different positions according to a copying magnification ratio selected. A pair of linking portions 144 and 146 conveniently positioned on opposite sides of the movable pulley 124 are formed in the setting members 134. The rope 126 extends from its one end fixed to the linking portion 144 of the setting member 134 toward the movable pulley 124, is wrapped about the movable pulley 124, then extends toward the driven member 116 fixed to one end of the first reflecting mirror assembly 66 and fixed to the driven member 116 at a position shown by 148. The rope 126 further extends toward the stationary pulley 120, is wrapped about it, then extends toward the stationary pulley 122 and is wrapped about it, and thereafter extends further toward the movable pulley 124 and is wrapped about the movable pulley 124 in a direction opposite to the first-mentioned wrapping direction. It further extends to the linking portion 146 of the setting member 134 and its other end is fixed to it.

It will be readily appreciated that because of the presence of the deceleration interlocking mechanism 118, when the first reflecting mirror assembly 66 is moved forwardly in the direction of an arrow 150, the second reflecting mirror assembly 72 is moved forwardly in interlocking relation to it in the direction of the arrow 150 at a moving speed one-half of the moving speed of the first reflecting mirror assembly 66, and likewise when the first reflecting mirror assembly 66 is moved backwardly in the direction of an arrow 152, the second reflecting mirror assembly 72 is moved backwardly in interlocking relation to it in the direction of the arrow 152 at a speed one-half of the moving speed of the first reflecting mirror assembly 66.

Furthermore, attention must be given to the following fact with regard to the deceleration interlocking mechanism 118 and the setting member 134. When the setting member 134 is moved in the direction of arrow 150 while the driving of the first reflecting mirror assembly 66 is suspended, the movable pulley 124 moves in the direction of arrow 150 according to the movement of the setting member 134 in the direction of arrow 150 while rotating clockwise as seen from left bottom in FIG. 2, and thus, the second reflecting mirror assembly 72 is moved in the direction of arrow 150 with respect to the first reflecting mirror assembly 66 by a distance one-half of the moving distance of the setting member 134 as the setting member 134 moves in the direction of arrow 150. This is because the first reflecting mirror assembly 66 is kept from moving because the driven member 116 fixed thereto is drivingly connected to a driving means as will be described hereinafter. Likewise, when the setting member 134 is moved in the direction of arrow 152 while the driving of the first reflecting mirror assembly 66 is suspended, the movable pulley 124 is moved in the direction of arrow 152, while rotating counterclockwise as seen from left bottom in FIG. 2, according to the movement of the setting member 134 in the direction of arrow 152. Thus, the second reflecting mirror assembly 72 is moved in the direction of arrow 152 with respect to the first reflecting mirror assembly 66 by a distance one-half of the moving distance of the setting member 134 according to the movement of the setting member 134 in the direction of arrow 152. The above movement of the second reflecting mirror assembly 72 according to the movement of the setting member 134 is utilized in changing the position of the second reflecting mirror assembly 72 when the projecting ratio of the optical system 60 (FIG. 1) is to be varied, as will be described in detail hereinafter.

Lens Assembly

Figure 3:
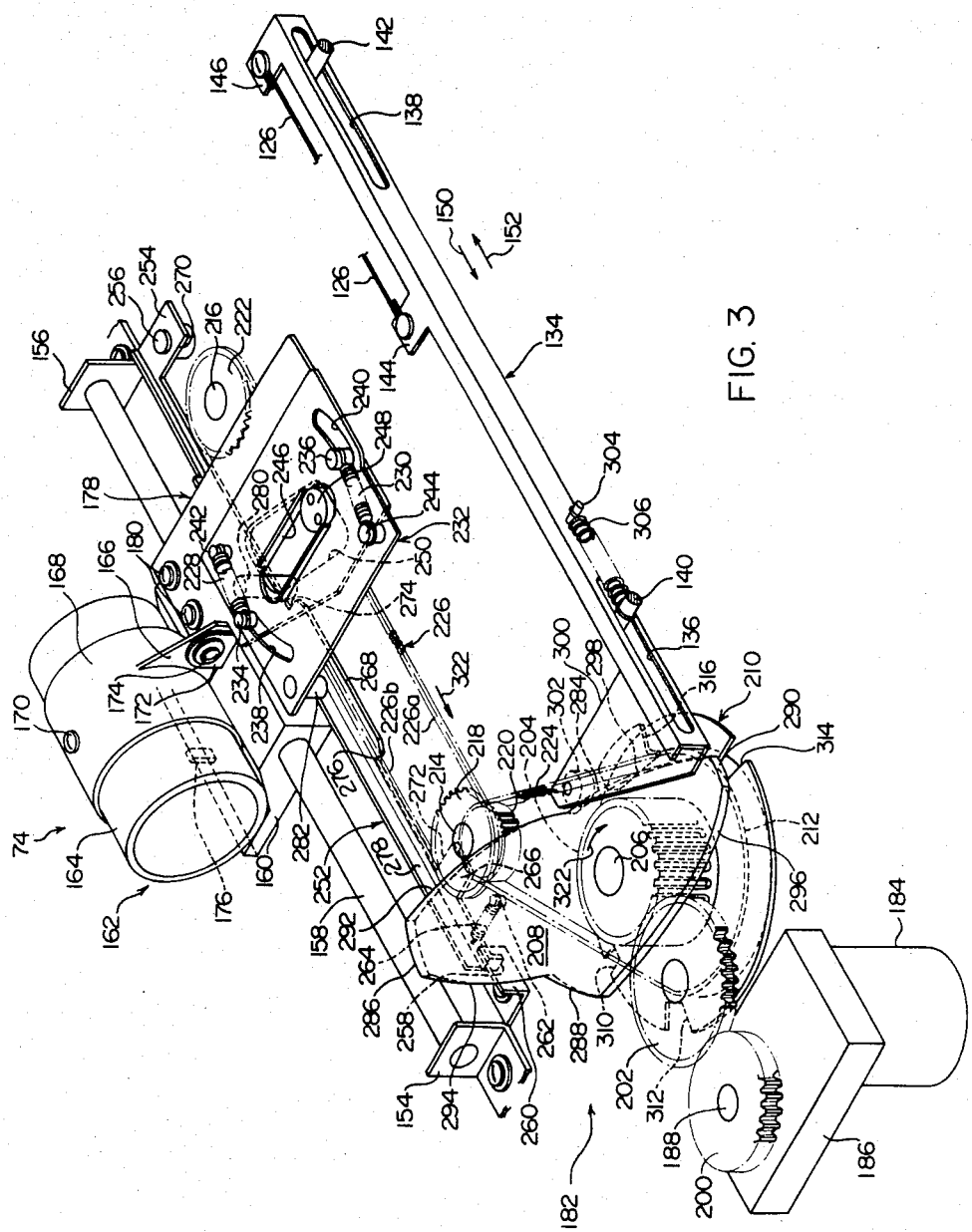
FIG. 3 is a partial perspective view showing a lens assembly and means for changing the projecting ratio of an optical system in the electrostatic copying apparatus shown in FIG. 1.

With reference to FIG. 3, a pair of brackets 154 and 156 are fixed to the base plate 6 (FIG. 1) within the housing 2 with a space therebetween in the reciprocating directions (the left and right directions in FIG. 1) of the first reflecting mirror assembly 66 and the second reflecting mirror assembly 72. A suspending rod 158 is fixed between the brackets 154 and 156.

The lens assembly 74 has a support block 160 to which a lens member 162 having at least one lens is fixed. The lens member 162 has a cylindrical lens housing 164. A linking sleeve 168 having a linking projection 166 is received about the lens housing 164 and fixed to the lens housing 164 by means of a setscrew 170. On the other hand, an upstanding piece 172 is formed on the support block 160, and the lens member 162 is fixed to the support block 160 by fixing the linking projection 166 of the linking sleeve 168 to the upstanding piece 172 by means of a setscrew 174. One end portion of the support block 160 of the lens assembly 74 is slidably mounted on the suspending rod 158, and a downwardly extending suspending piece 176 is formed at the other end of the support block 160. The lower end of the suspending piece 176 is kept in contact with the upper surface of the base plate 6 (FIG. 1) provided within the housing 2. Thus, the lens assembly 74 is mounted slidably along the suspending rod 158.

To one end portion of the support block 160 of the lens assembly 74 is fixed a driven member 178 extending widthwise from there by means of a pair of setscrews 180. As will be described in detail hereinafter, a driving force is transmitted to the driven member 178 to move the lens assembly 74 along the suspending rod 158 for changing the projecting ratio of the optical system 60 (FIG. 1).

Means for Varying the Projecting Ratio of the Optical System

The illustrated variable magnification electrostatic copying apparatus in accordance with this invention is constructed such that it can produce copies at a copying magnification ratio selected from a 1:1 ratio, a first reduced ratio (a length ratio of about 0.82 and an area ratio of about 0.67), a second reduced ratio (a length ratio of about 0.7 and an area ratio of about 0.5), and an increased ratio (a length ratio of about 1.27 and an area ratio of about 1.6). In the case of the 1:1 ratio, the lens assembly 74 and the second reflecting mirror assembly 72 are held at the positions shown by solid lines in FIG. 1. In the case of copying at the first reduced ratio, the lens assembly 74 and the second reflecting mirror assembly 72 are held at the positions shown by two-dot chain lines $74R_1$ and $72R_1$ in FIG. 1. In the case of copying at the second reduced ratio, the lens assembly 74 and the second reflecting mirror assembly 72 are held at the positions shown by two-dot chain lines $74R_2$ and $72R_2$ in FIG. 1. In the case of copying at the increased ratio, the lens assembly 74 and the second reflecting mirror assembly 72 are held at the positions shown by two-dot chain lines 74E and 72E in FIG. 1. The positioning of the lens assembly 74 and the second reflecting mirror assembly 72 as described above is effected when the reciprocations of the first reflecting mirror assembly 66 and the second reflecting mirror assembly 72 are suspended and these assemblies 66 and 72 are held at their forward movement start positions. Hence, the positions of the second reflecting mirror assembly 72 shown by the solid line and the two-dot chain lines $72R_1$, $72R_2$ and 72E in FIG. 1 are its positions at which it is held at the start of forward movement.

The illustrated variable magnification electrostatic copying apparatus constructed in accordance with this invention has means 182 for varying the projecting ratio of the optical system, which is adapted to hold the lens assembly 74 at a selected position among the four aforesaid positions and also the second reflecting mirror assembly 72 at a selected position among the aforesaid four positions in accordance with the selected copying magnification ratio.

With reference to FIG. 3, the illustrated projecting ratio varying means 182 includes a driving source 184 which is conveniently a reversible electric motor. The output shaft (not shown) of the driving source 184 is connected to the input shaft (not shown) of a decelerator 186, and a gear 200 is fixed to the output shaft 188 of the decelerator 186. The gear 200 is drivingly connected to a gear 204 via a gear 202. The gear 204 is fixed to an upstanding rotating shaft 206 rotatably mounted on the base plate 6 (FIG. 1). To the rotating shaft 206 are also fixed a cam plate 208 located above the gear 204, a detection plate 210 located below the gear 204, and a toothed pulley 212 located below the detection plate 210. As will be understood from the following description, the toothed pulley 212 constitutes an input element of a first drivingly connecting means interposed between the lens assembly 74 and the gear 204 rotated by the driving source 184; the cam plate 208 constitutes an input element of a second drivingly connecting means interposed between the gear 204 and the setting member 134; and the detection plate 210 cooperates with two detectors to be described hereinbelow.

The first drivingly connecting means interposed between the gear 204 and the lens assembly 74 will be described. A pair of upstanding rotating shafts 214 and 216 are rotatably mounted on the base plate 6 (FIG. 1) with a space therebetween in the longitudinal direction of the suspending rod 158, i.e. in the moving direction of the lens assembly 74. A driven wheel 218 which is conveniently a sprocket wheel and a toothed pulley 220 located below the driven wheel 218 are fixed to the rotating shaft 214, and a follower wheel 222 which is conveniently a sprocket wheel is fixed to the rotating shaft 216. An endless toothed belt 224 is wrapped about the toothed pulley 212 constituting the input element of the first drivingly connecting means and the toothed pulley 220 fixed to the rotating shaft 214. An endless wrapping power transmission member 226 composed of an endless chain is wrapped about the driven wheel 218 and the follower wheel 222. The wrapping power transmission member 226 has a pair of linear running sections 226a and 226b extending substantially parallel to the moving direction of the lens assembly 74.

On the other hand, the moving member 178 is fixed to the lens assembly 74 as stated hereinabove. To the driven member 178 is connected an interlocking member 232 through an interlocking spring member composed of two pull spring members 228 and 230. A pair of linking projections composed of a pair of pins set firmly and spaced from each other laterally of the moving direction of the lens assembly 74, namely a first linking projection 234 and a second linking projection 236, are provided on the upper surface of the driven member 178. The interlocking member 232 has formed therein a first linking slot 238 and a second linking slot 240 adapted for receiving the first and second linking projections 234 and 236 respectively. The first linking slot 238 extends in an arcuate shape having the second linking projection 236 as a center, and the second linking slot 240 extends in an arcuate shape having the first linking projection 234 as a center. Accordingly, with regard to the driven member 178, the interlocking member 232 can pivot about the first linking projection 234 as a center over an angular range defined by the second linking slot 240, and also about the second linking projection 236 as a center over an angular range defined by the first linking slot 238. On the upper surface of the interlocking member 232 are set up firmly a first engaging pin 242 and a second engaging pin 244 in relation to the first linking slot 238 and the second linking slot 240, respectively. The pull spring member 228 is connected to the first linking projection 234 provided in the driven member 178 and the first engaging pin 242 provided in the interlocking member 232, and the pull spring member 230 is connected to the second linking projection 236 provided in the driven member 178 and the second engaging pin 244 provided in the interlocking member 232. The pull ring member 228 elastically biases the interlocking member 232 clockwise as seen from above in FIG. 3 about the second linking projection 236 as a center with respect to the driven member 178, and the pull spring member 230 elastically biases the interlocking member 232 clockwise as viewed from above in FIG. 3 about the first interlocking projection 234 as a center with respect to the driven member 178. Thus, normally, the interlocking member 232 is elastically held at the interlocking relation position shown in FIG. 3 by the pull springs 228 and 230 with respect to the driven member 178.

An engaging slot 246 extending substantially at right angles to, and across, the pair of linear running sections 226a and 226b of the wrapping power transmission member 226 is formed in the central portion of the interlocking member 232. On the other hand, an interlocking projection 248 composed of a cylindrical member is set up in the wrapping power transmission member 226. As is clearly shown in FIG. 3, the interlocking member 232 is engaged with the interlocking projection 248 by inserting the interlocking projection 248 in the engaging slot 246. Thus, as will be stated hereinbelow, when the wrapping power transmission member 226 is driven, the interlocking member 232 is moved incident to the movement of the wrapping power transmission member 226. As will be understood from FIG. 3, an opening 250 nearly in the shape of a parallelogram is formed in the driven member 178, and the interlocking projection 248 set up in the wrapping power transmission member 226 is inserted in the engaging slot 246 formed in the interlocking member 232 through the opening 250. As will be described hereinbelow, when the interlocking member 232 turns from the interlocking relation position shown in FIG. 3 about the first linking projection 234 or the second linking projection 236 with respect to the driven member 178 against the elastic biasing action of the interlocking spring member composed of the pull springs 228 and 230, the linking projection 248 moving together with the interlocking member 232 with respect to the driven member 178 moves within the opening 250 formed in the driven member 178 and does not directly act on the driven member 178.

In the illustrated embodiment, a position setting means 252 is disposed in relation to the lens assembly 74. The illustrated position setting means 252 is constructed of an elongated member extending in the moving direction of the lens assembly 74. At one end of the position setting means 252 is formed a projecting portion 254 projecting widthwise. The projecting portion 254 is mounted pivotally on an upstanding shaft 256 set up firmly in the base plate 6 (FIG. 1). A downwardly extending suspending portion 258 is formed at the other end of the position setting means 252, and corresponding to the suspending portion 258, a stop member 260 having an upstanding portion is fixed to the base plate 6 (FIG. 1). The above base plate 6 also has an engaging pin 262 set firmly therein, and a pull spring member 264 is stretched between the engaging pin 262 and the other end portion of the position setting means 252. The pull spring member 264 elastically biases the position setting means 252 counterclockwise as seen from above in FIG. 3 about the upstanding shaft 256 as a center, and thus, the position setting means 252 is normally maintained elastically by the pull spring member 264 at an operating position shown in FIG. 3 at which the suspending portion 258 abuts against the upstanding portion of the stop member 260. In addition to the projection portion 254, the position setting means 252 also has a projecting portion 266 formed in the vicinity of its other end portion, and a projecting portion 268 formed midway between its opposite ends. As will be clear from the following description, the inside edge 270 of the projecting portion 254, the inside edge 272 of the projecting portion 266 and both side edges 274 and 276 of the projecting portion 268 constitute a stop portion for positioning the lens assembly 74 at a required position. The inside edge 270 of the projecting portion 254 and the inside edge 272 of the projecting portion 266 are located on opposite ends of the moving path of the lens assembly 74, and the both side edges 274 and 276 of the projecting portion 268 are located in a middle portion in the moving path of the lens assembly 74. The inside edge 270 of the projecting portion 254 corresponds to an enlargement position (the position shown by the two-dot chain line 74E in FIG. 1) of the lens assembly 74; one side edge 274 of the projecting portion 268, to a 1:1 ratio position (the position shown by the solid line in FIG. 1) of the lens assembly 74; the other side edge 276 of the projecting portion 268, to a first reduction position (the position shown by the two-dot chain line $74R_1$ in FIG. 1) of the lens assembly 74; and the inside edge 272 of the projecting portion 266, to a second reduction position (the position shown by the two-dot chain line $74R_2$ in FIG. 1) of the lens assembly 74. The position setting means 252 further has an upstanding portion 278. As clearly shown in FIG. 3, the upstanding portion 278 is cut at one end portion of the position setting means 252.

In relation to the position setting means 252 described above, an abutting projection 280 is provided in the lens assembly 74, and a releasing projection 282 constituting a releasing means is provided in the interlocking member 232. In the illustrated embodiment, the abutting projection 280 is composed of a pin set up firmly in the under surface of the driven member 178, and the releasing projection 282 is constructed of a pin set firmly in the under surface of the interlocking member 232. The mutual actions of the position setting means 252 and the abutting projection 280 and the releasing projection 282 will be described in detail hereinafter.

The second drivingly connecting means interposed between the gear 204 and the setting member 134 will now be described. The cam plate 208 which constitutes the input element of the second drivingly connecting means has formed on its peripheral surface four arcuate positioning surfaces 284, 286, 288 and 290 and transition surfaces 292, 294, 296 and 298 located among these arcuate positioning surfaces. The four arcuate positioning surfaces 284, 286, 288 and 290 have the shape of an arc having the central axis of rotation of the cam plate 208 (i.e., the central axis of the rotating shaft 206 to which the cam plate 208 is fixed) although they have different radii from each other. As will be clear from the following description, the arcuate positioning surface 284 holds the second reflecting mirror assembly 72 at the 1:1 ratio position (shown by the solid line in FIG. 1); the arcuate positioning surface 286, at the second reduction position (shown by the two-dot chain line 72R$_2$ in FIG. 1); the arcuate positioning surface 288, at the first reduction position (shown by the two-dot chain line 72R$_1$ in FIG. 1); and the arcuate positioning surface 290, at the enlargement position (shown by the two-dot chain line 72E in FIG. 1).

A projecting portion 300 is formed at one end portion of the setting member 134, and a follower roller 302 constituring a cam follower member is rotatably mounted on the projecting portion 300. An engaging pin 304 is set up firmly in the setting member 134, and a pull spring member 306 is connected to the engaging pin 304 and the support shaft 140 set firmly in the upstanding base plate (not shown) disposed within the housing 2 (FIG. 1). The pull spring member 306 elastically biases the setting member 134 in the direction of arrow 150, and thus causes the follower roller 302 to abut elastically against the cam plate 208. Accordingly, it will be appreciated that when the cam plate 208 is rotated and the follower roller 302 is caused to abut against any one of the transition surfaces 292, 294, 296 and 298, the setting member 134 is moved in the direction of arrow 150 or 152, and while the follower roller 302 is caused to abut against any one of the arcuate actuating surfaces 284, 286, 288 and 290, the setting member 134 is maintained at a spedified position without being moved. When the setting member 134 is moved in the direction of arrow 150 or 152, the second reflecting mirror assembly 72 (FIG. 2) is moved in the direction of arrow 150 or 152, as already described hereinabove with reference to FIG. 2.

As stated above, the detection plate 210 is also fixed to the rotating shaft 206 to which the gear 204, the toothed pulley 212 and the cam plate 208 are fixed. As will be readily understood from FIG. 4-A taken in conjunction with FIG. 3, the detection plate 210 is of a disc shape, and four cuts 308, 310, 312 and 314 are formed in its peripheral edge portion at predetermined intervals in the circumferential direction. A light shielding member 316 is also fixed to the detection plate 210. In relation to the detection plate 210, two detectors, i.e. a first detector 318 and a second detector 320 (see FIG. 4-A as these devices are omitted in FIG. 3), are provided. The first detector 318 has a light emitting element and a light receiving element located at opposed positions above and below the peripheral edge portion of the detection plate 210. When the light from the light emitting element is shut off by the peripheral edge portion of the detection plate 210 and is not fed to the light receiving element, the first detector 318 produces an output signal "H". When any one of the cuts 308, 310, 312 and 314 is positioned between the light emitting element and the light receiving element and as a result the light from the light emitting element falls upon the light receiving element, the first detector 318 produces an output signal "L". The second detector 320 has a light emitting element and a light receiving element positioned opposite to each other above and below the light shielding member 316 fixed to the detection plate 210, and produces an output signal "L" when the light from the light emitting element falls upon the light receiving element without being shut off. The second detector 320 produces an output signal "H" when the light from the light emitting element is shut off as a result of positioning of the light shielding member 316 between the light emitting element and the light receiving element and no longer falls upon the light receiving element.

Now, the operation and effect of the projecting ratio varying means 182 described above will be stated in detail with reference to FIGS. 4-A, 4-B, 4-C, 4-D and 4-E taken in conjunction with FIGS. 1 to 3.

As will be described hereinbelow, in the illustrated embodiment, when the lens assembly 74 and the second reflecting mirror assembly 72 are moved in order to vary the projecting ratio of the optical system 60, the driving source 184 of the projecting ratio varying means 182 is rotated in a predetermined direction to rotate the gear 204 in the direction shown by an arrow 322. Accordingly, the wrapping power transmission member 226 in the first drivingly connecting means is moved in the direction of arrow 322, and the cam plate 208 in the second drivingly connecting means is rotated in the direction of arrow 322.

For the convenience of description, let us assume that the lens assembly 74 is at the position shown in FIG. 3. When the wrapping power transmission member 226 is moved in the direction of arrow 322 in such a state, the movement of the wrapping power transmission member 226 is transmitted from the interlocking projection 248 to the lens assembly 74 through the interlocking, member 232, the spring members 228 and 230 and the driven member 178, and thus, the interlocking member 232, the spring members 228 and 230, the driven member 178 and the lens assembly 74 are moved as a unit in the direction of arrow 150.

When the lens assembly 74 is moved in the direction of arrow 150 and reaches the 1:1 ratio position shown in FIG. 4-A (the 1:1 ratio position shown by the solid line in FIG. 1), the abutting projection 280 provided at the under surface of the driven member 178 abuts against one side edge 274 of the projecting portion 268 of the position setting means 252, thereby preventing the driven member 178 and the lens assembly 74 from further moving in the direction of arrow 150. But even when the lens assembly 74 and the second reflecting mirror assembly 72 are positioned at the 1:1 ratio position, the driving source 184 does not stop rotating upon abutting of the abutting projection 280 against the side edge 274 of the projecting portion 268 of the position setting means 280, and the wrapping power tramsmission member 226 continues to be moved in the direction of arrow 322. When the wrapping power transmission member 226 is further moved in the direction of arrow 322, this motion of the wrapping power transmission member 226 is transmitted from the interlocking projection 248 to the interlocking member 232. As a result, by abutting of the abutting projection 280 against the side edge 274 of the projecting portion 268, the driven member 178 is prevented from moving further in the direction of arrow 150. Hence, the interlocking member 232 is pivotally displaced with respect to the driven member 178 in the direction of an arrow 324 about the first interlocking projection 234 provided in the driven member 178 as a center against the elastic biasing action of the spring member 230 from the position shown by a two-dot chain line in FIG. 4-A (the interlocking position with respect to the driven member 178) to the position shown by the solid line in FIG. 4-A. When the interlocking member 232 continues to be pivotally displaced in the direction of arrow 324 with respect to the driven member 178 by the further movement of the wrapping power transmission member 226 in the direction of arrow 322, the releasing projection 282 provided on the under surface of the interlocking member 232 acts on the upstanding portion 278 of the position setting means 252 to pivot the position setting means 252 in the direction of an arrow 326 about the upstanding shaft 256 as a center against the elastic biasing action of the spring member 264 from its operating position shown by the solid line in FIG. 4-A and a two-dot chain line in FIG. 4-B to its releasing position shown by a solid line in FIG. 4-B, as will be readily understood from a comparison of FIG. 4-A with FIG. 4-B. When the position setting means 252 is held at the releasing position shown by the solid line in FIG. 4-B, the side edge 274 of the projecting portion 268 moves away from the abutting projection 280, and therefore, the driven member 178 and the lens assembly 74 can move from the 1:1 ratio position shown in FIG. 4-A further in the direction of arrow 150. After this, the interlocking member 232, the spring members 228 and 230, the moving member 178 and the lens assembly 74 are moved in the direction of arrow 150 according to the movement of the wrapping power transmission member 226 in the direction of arrow 322. At this time, the interlocking member 232 and the driven member 178 are returned to the interlocking relation position shown in FIG. 3 by the elastic biasing action of the spring member 230. In more detail, the elastic biasing action of the spring member 230 moves the driven member 178 and the lens assembly 74 somewhat in the direction of arrow 150 relative to the interlocking member 232, whereby the interlocking member 232 is pivotally displaced relative to the driven member 178 in a direction opposite to the direction of arrow 324 about the first linking projection 234 as a center and thus the interlocking member 232 and the driven member 178 are returned to the interlocking relation position illustrated in FIG. 3. When the driven member 178 and the lens assembly 74 move in the direction of arrow 150 and the abutting projection 280 goes past the projecting portion 268 of the position setting means 252, the position setting means 252 is returned to the operating position shown by the solid line in FIG. 4-A and the two-dot chain line in FIG. 4-B by the elastic biasing action of the spring member 264.

When the lens assembly 74 and the second reflecting mirror assembly 72 are to be positioned at the 1:1 ratio position, the rotation of the dirving source 184 is stopped at a suitable point in time, for example at a point shown by the solid line in FIG. 4-A at which the interlocking member 232 has been pivotally displaced to some extent with respect to the driven member 178, during the time period from the time when the abutting projection 280 provided on the under surface of the driven member 178 has abutted against the side edge 274 of the projecting portion 268 of the position setting means 252 held at this operating position to the time shown in FIG. 4-B, i.e. the time when the interlocking member 232 has been pivotally displaced with respect to the driven member 178 and the releasing projection 282 has moved the position setting means 252 to the releasing position. At the time shown in FIG. 4-A, the abutting projection 280 provided on the under surface of the driven member 178 is elastically maintained in condition for abutting against the side edge 274 of the projecting portion 268 of the position setting means 252 by the elastic biasing action of the spring member 230, and thus the lens assembly 74 is accurately held elastically at the 1:1 ration position.

On the other hand, in the state shown in FIG. 4-A, the cam plate 208 is positioned at an agular position at which the arcuate positioning surface 284 acts on the follower roller 302. As a result, the setting member 134 is accurately positioned at a predetermined position, and the second reflecting mirror assembly 72 is accurately held at the 1:1 ratio position shown by the solid line in FIG. 1. At the time when the rotation of the driving source 184 is stopped, it is not necessary for the cam plate 208 to be precisely held at a predetermined angular position. If only the cam plate 208 is positioned at an angular position at which the arcuate positioning surface 284 acts on the follower roller 302, the setting member 134 is accurately held at a predetermined position and the second reflecting mirror assembly 72 is accurately held at the 1:1 ratio position shown by the solid line in FIG. 1.

In the state shown in FIG. 4-A, the detection plate 210 rotating as a unit with the cam plate 208 is held at an angular position at which the cut 308 is detected by the first detector 138 and the light shielding member 316 is detected by the second detector 320. Hence, the first detector 318 produces an output signal "L", and the second detector 320, an output signal "H". The output signals of the first and second detectors 318 and 320 are used to control the driving source 184 of the projecting ratio varying means 182 as will be stated hereinafter.

When the driving source 184 is further rotated and the wrapping power transmission member 226 is further moved in the direction of arrow 322, after going through the state shown in FIG. 4-B from the state shown in FIG. 4-A, the interlocking member 232, the spring members 228 and 230, the driven member 178 and the lens assembly 74 are moved in the direction of arrow 150 according to the movement of the wrapping power transmission member 226 in the direction of arrow 322. When the lens assembly 74 is held at the second reduction position shown in FIG. 4-C (the position shown by the two-dot chain line $74R_2$ in FIG. 1), the abutting projection provided at the under surface of the driven member 178 abuts against the inside edge 272 of the projecting portion 266 of the position setting means 252, and thus, the driven member 178 and the lens assembly 74 are prevented from moving further in the direction of arrow 150. However, even when the lens assembly 74 and the second reflecting mirror assembly 72 are held at the second reduction position, the rotation of the driving source 184 is not stopped at the time when the abutting projection 280 abuts against the inside edge 272 of the projecting portion 266 of the position setting means 252, and the wrapping power transmission member 226 continues to move in the direction of arrow 322. It will be readily appreciated with reference to FIG. 4-C that in such a movement of the wrapping power transmission member 226, the interlocking projection 248 set firmly in the wrapping power transmission member 226 moves from one linear running section 226a of the wrapping power transmission member 226 to the other linear running section 226b through the surrounding of the driven wheel 218. Hence the interlocking member 232 moving incidental to the interlocking projection 248 moves in the direction of arrow 150 and then in an opposite direction, i.e. the direction of arrow 152. Since at this time the driven member 178 is prevented from moving in the direction of arrow 150 as a result of the abutting projection 280 abutting against the inside edge 272 of the projecting portion 266, the interlocking member 232 is pivotally displaced with respect to the driven member 178 from the interlocking relation position shown in FIG. 3 in the direction of arrow 324 about the first linking projection 234 provided in the driven member 178 as a center against the elastic biasing action of the spring member 230 as shown in FIG. 4-C according to the movement of the interlocking member 232 in the direction of arrow 150. Then, as the interlocking member 232 moves in the direction of arrow 152, it is pivotted in a direction opposite to the direction of arrow 324 about the first linking projection 234 as a center, and thus returned to the interlocking relation position as shown in FIG. 3 with respect to the driven member 178. During the above pivoting of the interlocking member 232 with respect to the driven member 178, the releasing projection 282 provided in the under surface of the interlocking member 232 never acts on the position in setting member 252 because as can be easily seen from FIG. 4-C, the releasing projection 282 exists on the left side of the position setting means 252 beyond its other end. Thereafter, the interlocking member 232, the spring members 228 and 230, the driven member 178 and the lens assembly 74 are moved in the direction of arrow 152 according to the movement of the wrapping power transmission member 226 in the direction of arrow 322.

When the lens assembly 74 and the second reflecting mirror assembly 72 are positioned at the second reduction position, the rotation of the driving source 184 is stopped at a suitable point in time, for example at the time point shown in FIG. 4-C at which the interlocking member 232 has pivoted somewhat with respect to the driven member 178, during the time period from the time when the abutting projection 280 provided on the under surface of the driven member 178 has abutted against the inner side edge 272 of the projecting portion 266 of the position setting means 252 to the time when the interlocking member 232 pivotally displaced with respect to the driven member 178 has been returned to the interlocking relation position with respect to the driven member 178. At the time point shown in FIG. 4-C, the abutting projection 280 is elastically maintained in condition for abutting against the inside edge 272 of the projecting portion 266 of the position setting means 252 by the elastic biasing action of the spring member 230, and thus, the lens assembly 74 is accurately held elastically at the second reduction position.

While the lens assembly 74 is moved from the 1:1 ratio position illustrated in FIG. 4-A to the second reduction position shown in FIG. 4-C, the cam plate 208 is rotated from the angular position shown in FIG. 4-A to the angular position shown in FIG. 4-C at which the arcuate positioning surface 286 acts on the follower roller 302. During this rotation of the cam plate 208, the setting member 134 is moved from the position shown in FIG. 4-A in the direction of arrow 152 by the action of the transition surface of the cam 208, and then held accurately at the position shown in FIG. 4-C by the action of the arcuate positioning surface 286. As a result, the second reflecting mirror assembly 72 is moved from the 1:1 ratio position shown by the solid line in FIG. 1 to the second reduction position shown by the two-dot chain line $72R_2$ in FIG. 1 and positioned accurately at this second reduction position.

The detection plate 210 rotating as a unit with the cam plate 208 is rotated from the angular position shown in FIG. 4-A to the angular position shown in FIG. 4-C. When the detection plate 210 is held at the angular position shown in FIG. 4-C, the first detector 318 detects the cut 310 and produces an output signal "L". The second detector 320, on the other hand, does not detect the light shielding member 316, and therefore produces an output signal "L".

When the driving source 184 is further rotated and the wrapping power transmission member 226 is further moved in the direction of arrow 322, the interlocking member 232, the spring members 228 and 230, the driven member 178 and the lens assembly 74 are moved in the direction of arrow 152 according to the movement of the wrapping power transmission member 226 in the direction of arrow 322. When the lens assembly 74 is held at the first reduction position shown in FIG. 4-D (the reduction position shown by the two-dot chain line $74R_1$ in FIG. 1), the abutting projection 280 provided on the under surface of the driven member 178 abuts against the other side edge 276 of the projecting portion 268 of the position setting means 252, whereby the driven member 178 and the lens assembly 74 are prevented from moving in the direction of arrow 152. However, even when the lens assembly 74 and the second reflecting mirror assembly 72 are held at the first reduction position, the rotation of the driving source 184 is not stopped when the abutting projection 280 has abutted against the other side edge 276 of the projecting portion 268 of the position setting means 252, and the wrapping power transmission member 226 continues to move in the direction of arrow 322. When the wrapping power transmission member 226 is further moved in the direction of arrow 322, the movement of the wrapping power transmission member 226 is transmitted to the interlocking member 232 from the interlocking projection 248. As a result, since the driven member 178 is prevented from moving further in the direction of arrow 152 as a result of the abutting projection 280 abutting against the other side edge 276 of the projecting portion 268, the interlocking member 232 is pivotally displaced with respect to the driven member 178 in the direction of an arrow 328 about the second linking projection 236 provided in the driven member 178 against the elastic biasing action of the spring member 228, as shown in FIG. 4-D. When the interlocking member 232 continues to be pivotally displaced in the direction of arrow 328 with respect to the driven member 178 by the further movement of the wrapping power transmission member 226 in the direction of arrow 322, the releasing projection 282 provided on the under surface of the interlicking member 232 acts on the upstanding portion 278 of the position setting means 252. Consequently, the position setting means 252 is pivoted from its operating position shown in FIG. 4-D to its non-operating position (see the position shown by the solid line in FIG. 4-B) at which the other side edge 276 of the projecting portion 268 moves away from the abutting projection 280, about the upstanding shaft 256 as a center against the elastic biasing action of the spring member 264 in the same way as described with reference to FIG. 4-B. Thereafter, the driven member 178 and the lens assembly 74 can move further in the direction of arrow 152 from the first reduction position shown in FIG. 4-D, and therefore, the interlocking member 232, the spring members 228 and 230, the driven member 178 and the lens assembly 74 are moved in the direction of arrow 152 according to the movement of the wrapping power tramsmission member 226 in the direction of arrow 322. At this time, the interlocking member 232 and the driven member 178 are returned to the interlocking relation position shown in FIG. 3 by the elastic biasing action of the spring member 228. When the driven member 178 and the lens assembly 74 move in the direction of arrow 152 and the abutting projection 280 goes past the projecting portion 268 of the position setting means 252, the position setting means 252 is returned to the operation position shown in FIG. 4-D by the elastic biasing action of the spring member 264.

When the lens assembly 74 and the second reflecting mirror assembly 72 are held at the first reduction position, the rotation of the driving source 184 is stopped at a suitable point in time, for example the time point shown in FIG. 4-D at which the interlocking member 232 has been pivotally displaced to some extent with respect to the driven member 178, during the time period from the time when the abutting projection 280 provided on the under surface of the driven member 178 has abutted against the other side edge 276 of the projecting portion 268 of the position setting means 252 which is at the operating position to the time when the interlocking member 232 has been pivotally displaced with respect to the driven member 178 as described above and the releasing projection 282 has brought the position setting means 252 to the releasing position. At the time point shown in FIG. 4-D, the abutting projection 280 formed on the under surface of the driven member 178 is elastically maintained in condition for abutting against the other side edge 276 of the projecting portion 268 of the position settting means 252 by the elastic biasing action of the spring member 228, and thus, the lens assembly 74 is elastically held accurately at the first reduction position.

While the lens assembly 74 is moved from the second reduction position shown in FIG. 4-C to the first reduction position shown in FIG. 4-D, the cam plate 208 is rotated from the angular position shown in FIG. 4-C to the angular position shown in FIG. 4-D at which the arcuate positioning surface 288 acts on the follower roller 302. During such a rotation of the cam plate 208, the setting member 134 is moved from the position shown in FIG. 4-C in the direction of arrow 150 by the action of the transition surface 294 of the cam plate 208, and is accurately held at the position shown in FIG. 4-D by the action of the arcuate positioning surface 288. As a result, the second reflecting mirror assembly 72 is moved from the second reduction position shown by the two-dot chain line 72R$_2$ shown in FIG. 1 to the first reduction position shown by the two-dot chain line 72R$_1$ in FIG. 1 and accurately positioned at the first reduction position.

The detection plate 210 rotating as a unit with the cam plate 208 is rotated from the angular position shown in FIG. 4-C to the angular position shown in FIG. 4-D. When the detection plate 210 is held at the angular position shown in FIG. 4-D, the first detector 318 detects the recess 312 and thus produces an output signal "L". On the other hand, the second detector 320 does not detect the light shielding member 316 and therefore, produces an output signal "L".

When the driving source 184 is further rotated and the wrapping power transmission member 226 is moved further in the direction of arrow 322, the interlocking member 232, the spring members 228 and 230, the driven member 178 and the lens assembly 74 are moved in the direction of arrow 152 according to the movement of the wrapping power tramsmission member 226 in the direction of arrow 322 as stated above. When the lens assembly 74 is brought to the enlargement position shown in FIG. 4-E (the position shown by the two-dot chain line 74E in FIG. 1), the abutting projection 280 provided on the under surface of the driven member 178 abuts against the insdie edge 270 of the projecting portion 254 of the position setting means 252, whereby the driven member 178 and the lens assembly 74 are prevented from moving further in the direction of arrow 152. However, even when the lens assembly 74 and the second reflecting mirror assembly 72 are positioned at the enlargement position, the rotation of the driving source 184 is not stopped when the abutting projection 280 has abutted against the inside edge 270 of the projecting portion 254 of the position setting means 252, and the wrapping power transmission member 226 continues to be moved further in the direction of arrow 322. It is readily appreciated from FIG. 4-E that during this movement of the wrapping power transmission member 226, the interlocking projection 248 set up firmly in the wrapping power transmission member 226 moves from the linear running section 226b to the linear running section 226a through the surrounding of the driven wheel 222. Hence, the interlocking member 232 moving incident to the interlocking projection 248 moves in the direction of arrow 152 and then in an opposite direction, i.e. in the direction of arrow 150. Since at this time, the driven member 178 is prevented from moving in the direction of arrow 152 as a result of the abutting projection 280 abutting against the inside edge 270 of the projecting portion 254, the interlicking member 232 is pivotally displaced with respect to the driven member 178 in the direction of arrow 328 about the second linking projection 236 provided in the driven member 178 against the elastic biasing action of the spring member 228 as shown in FIG. 4-E from the interlocking relation position shown in FIG. 3 as the interlocking member 232 is moved in the direction of arrow 152. Thereafter, as it moves in the direction of arrow 150, the interlicking member 232 is pivoted in a direction opposite to the direction of arrow 328 about the second linking projection 236 as acenter, and thus returned to the interlocking relation position shown in FIG. 3 with respect to the driven member 178. It will be readily seen from FIGS. 3 and 4-E that during the aforesaid pivoting of the interlicking member 232 with respect to the driven member 178, the releasing projection 282 provided on the under surface of the interlocking member 232 passes through the cut portion at one end portion of the upstanding portion 278 of the position setting member 252, and therefore never acts on the position setting means 252. Thereafter, the interlocking member 232, the spring members 228 and 230, the driven member 178 and the lens assembly 74 are moved in the direction of arrow 150 according to the movement of the wrapping power transmission member 226 in the direction of arrow 322.

When the lens assembly 74 and the second reflecting mirror assembly 72 are held at the enlargement position, the rotation of the driving source 184 is stopped at a suitable point in time, for example at the time point shown in FIG. 4-E at which the interlocking member 232 has been pivotally displaced to some extent with respect to the driven member 178, during the time period between the time when the abutting projection 280 provided on the under surface of the driven member 178 has abutted against the inside edge 270 of the projecting portion 254 of the position setting means 252 to the time when the interlocking member 232 pivotally displaced with respect to the driven member 178 as described above has been returned to the interlocking relation position with respect to the driven member 178. At the time point shown in FIG. 4-E, the abutting projection 280 provided on the under surface of the driven member 178 is elastically maintained in condition for abutting against the inside edge 270 of the projecting portion 254 of the position setting means 252 by the elastic biasing action of the spring member 228, and thus the lens assembly 74 is elastically held accurately at the enlargement position.

While the lens assembly 74 is moved from the first reduction position shown in FIG. 4-D to the enlargement position shown in FIG. 4-E, the cam plate 208 is rotated from the angular position shown in FIG. 4-D to the angular position shown in FIG. 4-E at which the arcuate positioning surface 290 acts on the follower roller 302. During such a rotation of the cam plate 208, the setting member 134 is moved from the position shown in FIG. 4-D in the direction of arrow 150 by the action of the transition surface 296 of the cam plate 208, and accurately held at the position shown in FIG. 4-E by the action of the arcuate positioning surface 290. Consequently, the second reflecting mirror assembly 72 is moved from the first reduction position shown by the two-dot chain line 72R₁ in FIG. 1 to the enlargement position shown by the two-dot chain line 72E in FIG. 1 and accurately held at this enlargement position.

The detection plate 210 rotating as a unit with the cam plate 208 is rotated from the angular position shown in FIG. 4-D to the angular position shown in FIG. 4-E. When the detection plate 210 is brought to the angular position shown in FIG. 4-E, the first detector 318 detects the cut 314 and therefore produces an output signal "L". On the other hand, the second detector 320 does not detect the light shielding member 316, and therefore, produces an output signal "L".

When the driving source 184 is further rotated and the wrapping power transmission member 226 is moved further in the direction of arrow 322, the interlocking member 232, the spring members 228 and 230, the driven member 178 and the lens assembly 74 are moved in the direction of arrow 150 according to the movement of the wrapping power transmission member 226 in the direction of arrow 322, as stated hereinabove. At this time, the cam plate 208 is rotated from the angular position shown in FIG. 4-E toward the angular position shown in FIG. 4-A. During such a rotation of the cam plate 208, the setting member 134 is moved from the position shown in FIG. 4-E toward the position shown in FIG. 4-A in the direction of arrow 150 by the cooperative action of the transition surface 298 of the cam plate 208 and the spring member 306 (FIG. 3).

The projecting ratio varying means 182 described above has various excellent advantages among which are:
(a) Both the lens assembly 74 and the second reflecting mirror assembly 72 can be positioned at a desired position selected from a plurality of positions by a relatively simple and cheap construction having the single driving source 184.
(b) Even when some error exists in the time of stopping the rotation of the driving source 184, the lens assembly 74 and the second reflecting mirror assembly 72 can be held accurately at the desired positions.

In the illustrated specific embodiment, the position setting means 252 is formed of a single material, but if desired, it may be constructed of a plurality of members mounted independently from each other. Furthermore, in the illustrated embodiment, the position setting means is moved from the operating position to the releasing position by the action of the releasing projection 282 provided in the interlocking means 232. If desired, however, it is possible to provide a releasing means such as a solenoid in relation to the position setting means 252 and move the position setting means 252 at a desired time from the operating position to the releasing position by selectively actuating the releasing means (in which case, however, the component parts are likely to undergo damage when the releasing means is not accuated at the required time for some reason or other). Furthermore, when there are only two projecting magnification ratios to he selectively set and therefore it is only sufficient to position the lens assembly 74 (and the second reflecting mirror assembly 72) at one of the two positions, the necessity of moving the position setting means from the operating position to the releasing position can be obviated if the aforesaid two positions are set at the opposite ends of the moving path of the lens assembly 74.

Figure 5:
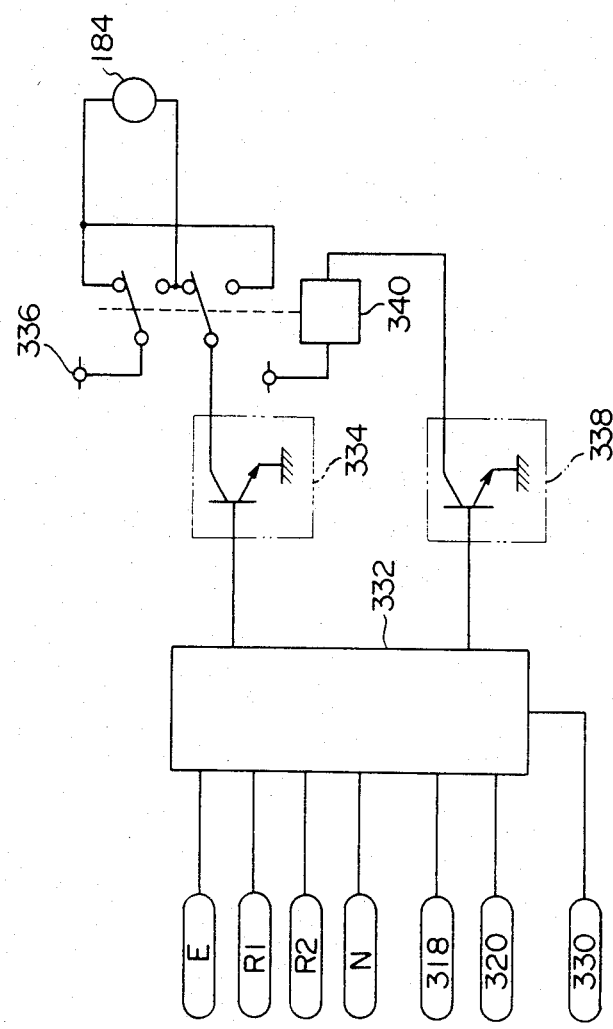
FIG. 5 is a block diagram showing one example of a circuit for controlling a driving source for the means for changing the projecting ratio of the optical system.

One example of controlling the operation of the driving source 184 of the projecting ratio varying means 182 will now be described mainly with reference to the simplified block diagram shown in FIG. 5.

The illustrated variable magnification electrostatic copying apparatus is constructed such that at whatever positions the lens assembly 74 and the second reflecting mirror assembly 72 are positioned (including the case where they are positioned at the 1:1 ratio position shown by the solid line in FIG. 1), when power is applied to the copying apparatus, the lens assembly 74 and the second reflecting mirror assembly 72 are moved and positioned accurately at the 1:1 ratio position shown by the solid line in FIG. 1. For example, when power is applied to the copying apparatus by closing a main switch (not shown) provided in the copying apparatus, a power application signal producing device 330 produces an output signal and feeds it to a control circuit 332. As a result, the control circuit 332 feeds a conduction signal to a first driver 334 to maintain the first driver 334 in conduction. When the first driver 334 conducts, a normal rotating current is fed from a power supply 336 to a driving source for the projecting ratio varying means 182, i.e. the reversible electric motor 184, to rotate the motor 184 normally. Thus, the gear 204 is rotated in the direction of arrow 322, the wrapping power transmission member 226 is moved in the direction of arrow 322, and the cam plate 208 is rotated in the direction of arrow 322. Consequently, the lens assembly 74 and the second reflecting mirror assembly 72 are moved as required. When they attain the state shown in FIG. 4-A in which the lens assembly 74 is held at the 1:1 ratio position shown by the solid line in FIG. 1 and the second reflecting mirror assembly 72 is held at the 1:1 ratio position shown by the solid line in FIG. 1, the first detector 318 detects the cut 308 of the detection plate 210 to produce an output signal "L" and feed it to the control circuit 332, and the second detector 320 detects the light shielding member 316 of the detection plate 210 to produce an output signal "H" and feed it to the control circuit 332, as already stated hereinabove with reference to FIG. 4-A. Consequently, the control circuit 332 feeds a conduction signal to a second driver 338 and maintains it in conduction. When the second driver 338 thus conducts, a relay 340 is energized to reverse the direction of connection between the power supply 336 and the motor 184, and a reversing current is fed to the motor 184. After the lapse of some time from the time when the control circuit 332 fed a conduction signal to the second driver 338, the control circuit 332 feeds a non-conduction signal to the first driver 334 to maintain it non-conducting and also feeds a non-conduction signal to the second driver 338 to maintain it non-conducting. Thus, the supply of current to the motor 184 is stopped, and the relay 340 is de-energized to return the connecting direction of the power supply 336 and the motor 184 to its original condition. When a reversing current is instantaneously fed to the normally rotating motor 184 in stopping the operation of the motor 184, the reversing current supplied instantaneously applies a braking action to the normal rotation of the motor 184 thereby preventing coasting of the motor 184 owing to inertia and sharply stopping the normal rotation of the motor 184. Thus, in the state shown in FIG. 4-A, the normal rotation of the electric motor 184 is stopped, and the lens assembly 74 and the second reflecting mirror assembly 72 are accurately held at the 1:1 ratio position shown by the solid line in FIG. 1.

When after the end of the above initial positioning the operator depresses a first reduction copying switch $R_1$, a second reduction copying switch $R_2$, or an enlarged copying switch E, the normal rotation of the motor 184 is started by the control circuit 332. When the state shown in FIG. 4-D, 4-C or 4-E is attained, the motor 184 is stopped (upon stopping of the motor 184, a reversing current is supplied instantaneously to apply a braking action as described above). Thus, the lens assembly 74 and the second reflecting mirror assembly 72 are definitely held at the first reduction positions shown by the two-dot chain lines $74R_1$ and $72R_1$ in FIG. 1, the second reduction positions shown by the two-dot chain lines $74R_2$ and $72R_2$ in FIG. 1, or the enlargement positions shown by the two-dot chain lines 74E and 72E in FIG. 1. When the operator depresses a 1:1 ratio copying switch N while the lens assembly 74 and the second reflecting mirror assembly 72 are at positions other than the 1:1 positions shown by the solid line in FIG. 1 (that is, at the first reduction positions, the second reduction positions or the enlargement positions), the lens assembly 74 and the second reflecting mirror assembly 72 are likewise held at the 1:1 ratio positions shown by the solid lines in FIG. 1. Of course, when the operator depresses the second reduction copying switch $R_2$ (or the enlarged copying switch E or the first reduction copying switch $R_1$) while the lens assembly 74 and the second reflecting mirror assembly 72 are at the first reduction positions (or the second reduction positions, or the enlargement positions), the lens assembly 74 and the second reflecting mirror assembly 72 are likewise held accurately at the second reduction positions (or the enlargement positions or the first reduction positions).

The states shown in FIGS. 4-C, 4-D and 4-E which correspond to the first reduction positions, the second reduction positions and the enlargement positions respectively are detected by using as a standard the state shown in FIG. 4-A which corresponds to the 1:1 ratio positions. Specifically, the control circuit 332 uses as a standard the state shown in FIG. 4-A in which the output signal of the first detector 318 is "L" and the output signal of the second detector 320 is "H". When from this state, the output signal of the first detector 318 changes to "H" and thereafter again changes to "L" as a result of detecting the cut 310 of the detection plate 210, the control circuit 332 detects the occurrence of the state shown in FIG. 4-C. When the output signal of the first detector 318 changes to "H" and thereafter again changes to "L" as a result of detecting the cut 312 of the detection plate 210, the control circuit 332 detects the occurrence of the state shown in FIG. 4-D. When the output signal of the first detector 318 changes to "H" and thereafter again changes to "L" as a result of detecting the cut 314 of the detection plate 210, the control circuit 332 detects the occurrence of the state shown in FIG. 4-E. According to these detections, the control circuit 332 properly controls the first driver 334 and the second driver 338.

Driving Means

Now, with reference to FIGS. 6 and 7, driving means shown generally at 342 in FIG. 6 for reciprocating the first reflecting mirror assembly 66 and the decond reflecting mirror assembly 72 of the optical system 60 will be described.

Figure 6:
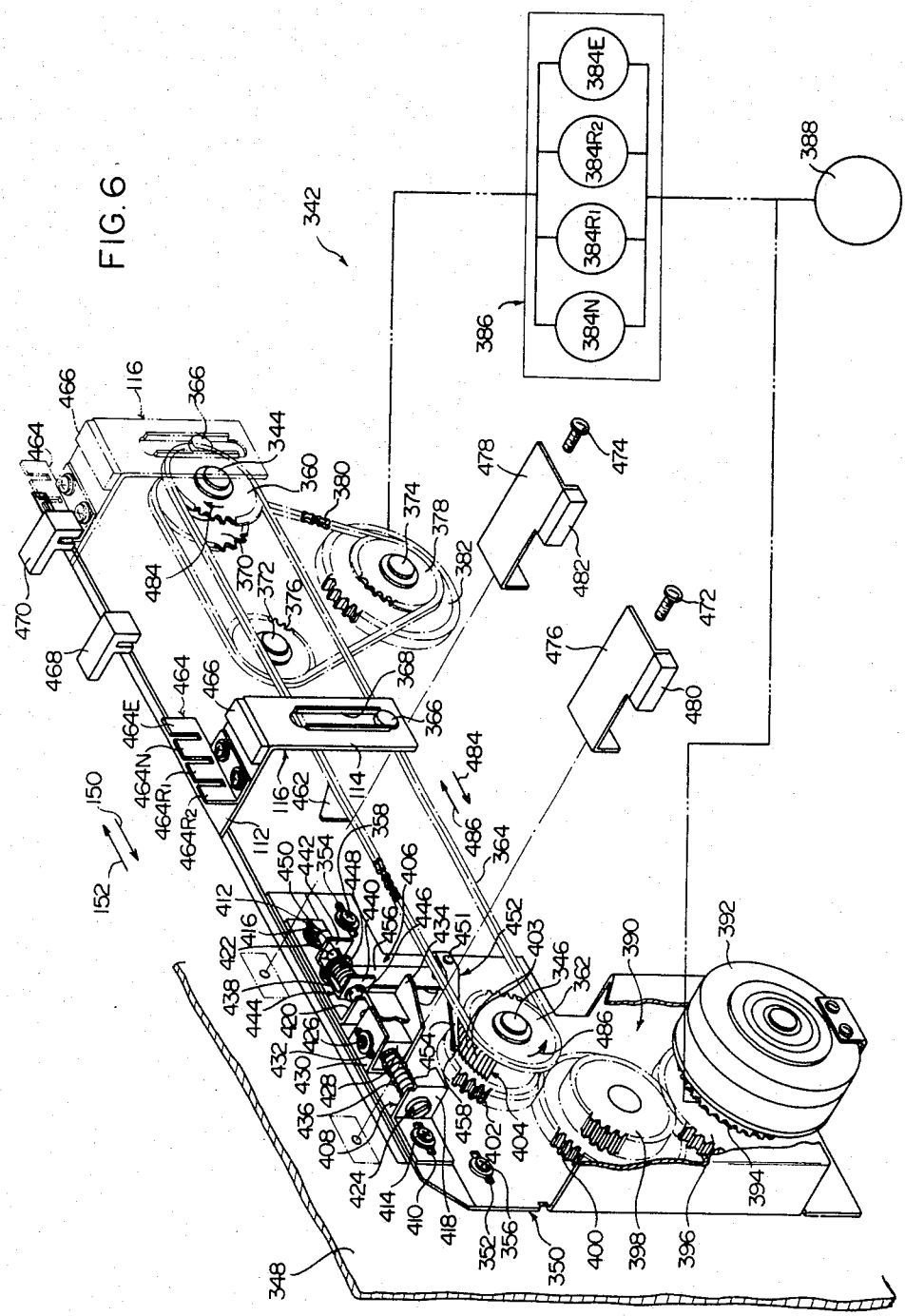
FIG. 6 is a partial perspective view showing, partly in a simplified from, driving means for reciprocating the first and second reflecting mirror assemblies of the optical system in the electrostatic copying apparatus shown in FIG. 1.

With reference to FIG. 6, a pair of shafts 344 and 346 are provided with a space therebetween in the reciprocating directions of the first reflecting mirror assembly 66 and the second reflecting mirror assembly 72 shown by arrows 150 and 152. The shaft 344 is set firmly in an upstanding base plate 348 disposed within the housing 2 (FIG. 1), and the shaft 346 is set firmly in a support frame 350 fixed to the upstanding base plate 348. Elongated slots 352, 354 and 355 (see FIG. 7 also) extending in the directions of arrows 150 and 152 are formed respectively at the upper two sides and the lower center of the support frame 350. By threadably engaging setscrews 356, 358 and 359 (see FIG. 7 also) with the upstanding base plate 348 through these slots 352, 354 and 355, the support frame 350 is fixed to the upstanding base plate 348 so that its position can be adjusted freely in the directions of arrows 150 and 152. Wheels 360 and 362 which are conveniently sprocket wheels are rotatably mounted on the shafts 344 and 346. An endless wrapping power transmission member 364 which is conveniently an endless chain is wrapped about these wheels 360 and 362. A cylindrical interlocking projection 366 is set firmly in the wrapping power transmission member 364. On the other hand, as already described with reference to FIG. 2, the driven member 116 having a horizontal portion 112 and a suspending portion 114 is fixed to the first reflecting mirror assembly 66. An engaging slot 368 extending in the vertical direction is formed in the suspending portion 114 of the driven member 116, and by inserting the interlocking projection 366 into the engaging slot 368, the driven member 116 is kept in engagement with the interlocking projection 366. It will be clear therefore that when the interlocking projection 366 is moved by the driving of the wrapping power transmission member 364 as described below, the first reflecting mirror assembly 66 is moved incident to the movement of the interlocking projection 366.

The shaft 344 having the wheel 360 mounted thereon further has mounted thereon an additional sprocket wheel 370 adapted for rotation as a unit with the wheel 360. In relation to the wheel 370, shafts 372 and 374 are set firmly in the upstanding base plate 348. A sprocket wheel 376 is rotatably mounted on the shaft 372, and a sprocket wheel 378 is rotatably mounted on the shaft 374. An endless chain 380 is wrapped about the wheels 370, 376 and 378. The shaft 374 also has mounted thereon a gear 382 adapted for rotation as a unit with the wheel 378. As shown in a simplified form, the output side of a power transmission mechanism 386 for forward movement including four selectively operable forward movement clutches 384N, 384R$_1$, 384R$_2$ and 384E is drivingly connected to the gear 382. The forward movement clutches 384N, 384R$_1$, 384R$_2$ and 384E may, for example, be electromagnetic clutches. The input side of the forward movement power transmission mechanism 386 is drivingly connected to a mian driving source 388.

The support frame 350 is equipped with a backward movement power transmission mechanism shown generally at 390. The backward movement power transmission mechanism 390 includes a backward movement clutch 392 which may be constructed of an electromagnetic clutch. A sprocket wheel 394 is provided on the input side of the backward movement clutch 392, and the wheel 394 is drivingly connected to the main driving source 388 as shown in a simplified form. A gear 396, on the other hand, is provided on the output side of the backward movement clutch 392. When the backward movement clutch 392 is operated, the gear 396 is connected to the wheel 394. The backward movement power transmission mechanism 390 further includes a gear 398 in mesh with the gear 396, a gear 400 adapted for rotation with the gear 398, and a gear 402 in mesh with the gear 400. The gear 402 is connected to the wheel 362 through a one-way clutch 404 (which constitutes part of a backward movement restricting means 406 to be described) having a plurality of engaging pawls 403 formed on its peripheral surface.

The illustrated driving means 342 further includes the backward movement restricting means 406 including the one-way clutch 404, for terminating the backward movement of the first reflecting mirror assembly 66 and the second reflecting mirror assembly 72 accurately at a predetermined position, i.e. a forward movement start position. With reference to FIG. 7 taken in conjunction with FIG. 6, a support member 408 is fixed to the upper end portion of the support frame 350. Elongated slots 410 and 412 extending in the directions of arrows 150 and 152 are formed respectively at the two opposite end portions of the support member 408, and by threadably engaging setscres 414 and 416 with the support frame 350 through the slots 410 and 412, the support member 408 is fixed to the support frame 350 so that its position is freely adjustable in the directions of arrows 150 and 152. The support member 408 has a pair of guide wall portions 418 and 420 spaced from each other in the directions of arrows 150 and 152. The guide wall portions 418 and 420 have formed therein holes which are in alignment in the directions of arrows 150 and 152. and a rod 422 is slidably inserted in these holes. A large-diameter head portion 424 is formed at one end of the rod 422 which is located on the left side of the guide wall portion 418 in FIG. 7. A block 428 and a channel-like abutting member 430 located outwardly of the block 428 are fixed by means of a setscrew 426 to that part of the rod 422 which is between the guide wall portions 418 and 420. An elongated slot 432 extending in the directions of arrows 150 and 152 is formed in the upper wall portion of the abutting member 430. The set-screw 426 is threadedly fitted with the rod 422 through the slot 432, and therefore, the abutting member 430 is fixed to the rod 422 so that its position is freely adjustable in the directions of arrows 150 and 152. The lower wall portion of the abutting member 430 has a projecting portion 434 projecting beneath the support member 408. A compression spring member 436 is interposed between the guide wall portion 418 and the block 428. The spring member 436 elastically biases the rod 422 and the block 428 and the abutting member 430 fixed thereto to the right in FIG. 7 and elastically maintains them at a position at which the head portion 424 of the rod 422 abuts against the guide wall portion 418. To the other end portion of the rod 422 which is located on the right side of the guide wall portion 420 in FIG. 7 is fixed slidably a channel-like member 444 having a wall portion 438 extending along the rod 422 and both end wall portions 440 and 442 extending substantially perpendicular to the wall portion 438. Furthermore, a stop ring 446 positioned on the left side of the end wall portion 440 of the member 444 in FIG. 7 and a stop ring 448 located between the two end wall portions 440 and 442 of the member 444 are also fixed to the other end portion of the rod 422. A compression spring member 450 is interposed between the end wall portion 440 of the member 444 and the stop ring 448. The spring member 450 elastically biases the member 444 to the left in FIG. 7 with respect to the rod 422 and maintains it elastically at a position at which its end wall portion 440 abuts against the stop ring 446. On the other hand, a pin 451 is set up firmly in the support frame 350, and a clutch control member 452 is pivotally mounted on the pin 451. The clutch control member 452 has a first arm 454 and a second arm 456. At the end of the first arm 454 is formed an engaging piece 458 which can engage the engaging pawl 403 formed on the peripheral surface of the one-way clutch 404. On the other hand, a vertically extending slot 439 (FIG. 7) is formed at the forward end portion of the second arm 456. The forward end portion of the second arm 456 is connected to the member 444 by inserting a pin 460 (FIG. 7) firmly set up in the wall portion 438 of the member 444 into the slot 439. The backward movement restricting means 406 further comprises an actuating piece 462 fixed to the wrapping power transmission member 364.

When the first reflecting mirror assembly 66 and the second reflecting mirror assembly 72 continue to move backwardly as described below and reach predetermined forward movement start positions, the actuating piece 462 fixed to the wrapping power transmission member 364 in the backward restricting means 406 described hereinabove abuts against the projecting portion 434 of the abutting member 430 fixed to the rod 422 to move the rod 422 from the position shown by a solid line in FIG. 7 to the position shown by a two-dot chain line in FIG. 7 against the elastic biasing action of the spring member 436. As a result, the member 444 mounted on the rod 422 is also moved from the position shown by a solid line in FIG. 7 to the position shown by a two-dot chain line in FIG. 7, and the clutch control member 452 is pivoted from its non-engaging position shown by a solid line in FIG. 7 to its engaging position shown by a two-dot chain line in FIG. 7. When the clutch control member 452 is held at the engaging position shown by the two-dot chain line in FIG. 7, the engaging piece 458 formed at the forward end of the first arm 454 engages any one of the engaging pawls 403 formed on the peripheral surface of the one-way clutch 404, and consequently the one-way clutch 404 is kept inoperative to release the connection between the gear 402 and the wheel 362.

Figure 7:
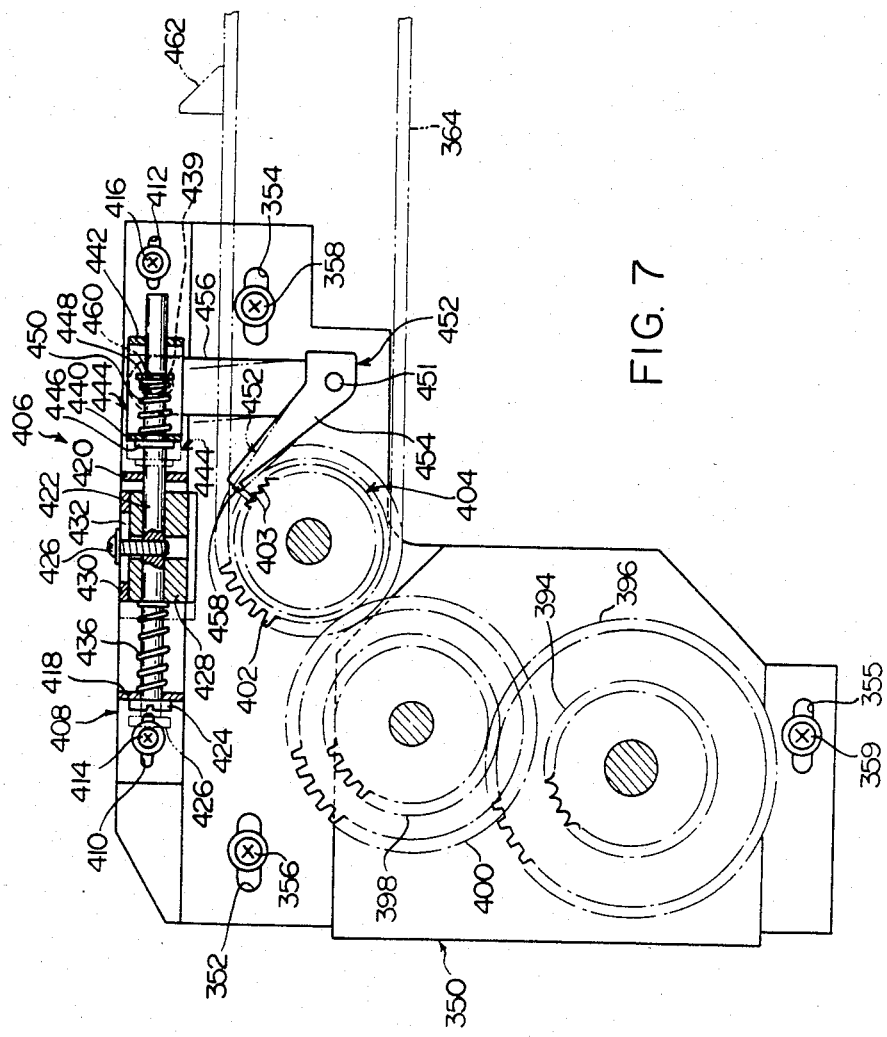
FIG. 7 is a partial sectional view showing a backward movement restricting means used in the driving means shown in FIG. 6.

On the other hand, when the first reflecting mirror assembly 66 and the second reflecting mirror assembly 72 start to move forwardly from the predetermined forward movement start positions as described hereinbelow, the actuating piece 462 moves away from the projecting portion 434 of the abutting member 430 fixed to the rod 422, as shown in FIGS. 6 and 7. As a esult, the rod 422 is returned to the position shown by the solid line in FIG. 7 by the elastic action of the spring member 436, and the member 444 is also returned to the position shown by the solid line in FIG. 7. Hence, the clutch control member 452 is returned to the non-engaging position shown by the solid line in FIG. 7 from the engaging position shown by the two-dot chain line in FIG. 7. As a result, the engaging piece 458 formed at the forward end of the first arm 454 of the clutch control member 452 disengages from the engaging pawl 403 formed on the peripheral surface of the one-way clutch 404 to maintain the one-way clutch 404 operable. Hence, the gear 402 and the wheel 362 are connected through the one-way clutch 404.

In the illustrated embodiment, the actuating piece 462 is fixed to the wrapping power transmission member 364. The actuating piece 462 may also be mounted at any other suitable place so long as it can move the first reflecting mirror assembly 66 and the second reflecting mirror assembly 72 and when these assemblies are held at predetermined forward movement start positions, can move the clutch control member 452 from the non-engaging position to the engaging position.

In the illustrated embodiment, a light-shielding member 464 having four upstanding light-shielding portions 464R$_2$, 464R$_1$, 464N and 464E and a permanent magnet 466 are fixed to the upper surface of the horizontal portion 112 of the driven member 116 provided in the first reflecting mirror assembly 66. With regard to the light-shielding member 464, a first movement detector 468 and a second movement detector 470 each having a light emitting element and a light receiving element located opposite to each other are fixed to predetermined positions of the upstanding base plate 348. Reed switches 480 and 482 cooperating with the permanent magnet 466 are fixed respectively to brackets 476 and 478 which are fixed to predetermined positions of the upstanding base plate 348 by setscrews 472 and 474 respectively.

The operation of the driving means 342 described above will be summarized below with reference to FIG. 1 taken in conjunction with FIG. 6.

In the case of 1:1 ratio copying, the forward movement clutch 384N of the forward movement power transmission mechanism 386 is selectively operated. The main driving source 388 is connected to the wheel 360 through the clutch 384N, the gear 382, the wheel 378, the chain 380 and the wheel 370, whereby the wheel 360 is rotated in the direction of arrow 484 and the wrapping power transmission member 364 is moved in the direction of arrow 484. As a result, the driven member 116, and therefore the first reflecting mirror assembly 66 (FIGS. 1 and 2), begin to move forwardly in the direction of arrow 150 from the forward movement start positions shown by the two-dot chain lines in FIG. 6 in interlocking relation to the interlocking projection 366 provided in the wrapping power transmission member 364. When the first reflecting mirror assembly 66 begins its forward movement, the second reflecting mirror assembly 72 also begins to move forwardly by the existence of the decelerating interlocking mechanism 118. It will be readily appreciated that while the interlocking projection 366 moves along the peripheral edge of the wheel 360, the forward movements of the first reflecting mirror assembly 66 and the second reflecting mirror assembly 72 in the direction of arrow 150 are gradually accelerated. When the interlocking projection 366 begins to move along the lower linear running section of the wrapping power transmission member 364, the first reflecting mirror assembly 66 is moved forward at a predetermined speed V and the second reflecting mirror assembly 72, at a speed of V/2. When the first reflecting mirror assembly 66 moves forwardly and the light-shielding portion 464N of the light shielding member 464 is positioned between the light emitting element and the light receiving element of the first movement detector 468, the first movement detector 468 detects it and produces a paper conveying start signal. Thus, the rotation of the carrying roller unit 44 of the paper conveying mechanism 34 shown in FIG. 1 is started, and the conveying of a copying paper which has been fed to the nip portion of the carrying roller unit 44 through the delivery passage 42a or 42b and is ready for conveying is started. In the illustrated embodiment, when the first reflecting mirror assembly 66 and the second reflecting mirror assembly 72 have advanced a predetermined distance from the time when the first movable detector 468 produced a paper conveying start signal, the scanning exposure of a document placed on the transparent plate 4 is started, and projection of the image of the document on the photosensitive member 10 begins. Thereafter, when the trailing end of the copying paper conveyed by the paper conveying mechanism 34 goes past a paper detector 488 disposed in the paper conveying passage, the paper detector 488 produces a scanning exposure termination signal. The length of the paper conveying passage from the detecting postion of the paper detector 488 to the transfer zone 28 is made substantially equal to the length of the moving path of the photosensitive member 10 from the exposure zone 26 to the transfer zone 28. When the scanning exposure termination signal is produced, the forward movement clutch 384N is maintained non-operative to stop the rotation of the wheel 360 and the forward movement of the first reflecting mirror assembly 66 and the second reflecting mirror assembly 72. Simultaneously with, or immediately after, this, the backward movement clutch 392 of the backward movement power transmission mechanism 390 is actuated. Thus, the main driving source 388 is connected to the wheel 362 through the wheel 394, the backward movement clutch 392, the gears 396, 398, 400 and 402, and the one-way clutch 404 in an operative condition, whereby the wheel 362 is rotated in the direction of arrow 486 and the wrapping power transmission member 364 is moved in the direction of arrow 486. As a result, the first reflecting mirror assembly 66 begins to move backwardly in the direction of arrow 152 at a speed of, for example, 2.3V, and the second reflecting mirror assembly 72 begins to move backwardly in the direction of arrow 152 at a speed of 2.3V/2. When the first reflecting mirror assembly 66 and the second reflecting mirror assembly 72 continue to move backwardly and approach their forward movement start positions and the interlocking projection 366 set up firmly in the wrapping power transmission member 364 begins to move along the peripheral edge of the wheel 360, the backward movements of the first and second reflecting mirror assemblies 66 and 72 in the direction of arrow 152 are gradually decelerated, as will be readily understood. When the first and second reflecting mirror assemblies 66 and 72 return to their forward movement start position (namely, when the driven member 116 returns to the position shown by the two-dot chain line in FIG. 6), the backward movement restricting means 406 acts as described above to maintain the one-way clutch 404 inoperative. Thus, the rotation of the wheel 360 is stopped, and the first and second reflecting mirror assemblies 66 and 72 are stopped accurately at the predetermined forward movement start positions. Substantially simultaneously with this, the second movement detector 470 detects the light shielding portion $464R_2$ of the light shielding member 464 and produces a backward movement termination signal. Consequently, after the lapse of some time, the backward movement clutch 392 is maintained inoperative.

It is possible to omit the backward movement restricting means 406, and to maintain the backward movement clutch 392 inoperative after the second movement detector 470 has produced a backward movement termination signal. This, however, causes the following inconvenience. When the backward movement clutch 392 is made of an electromagnetic clutch and is operated repeatedly for a long period of time, deenergization of the clutch may not sharply render it inoperable because of the heat generated during the long-term operation, and some error tends to occur between the time of deenergization and the time at which the clutch becomes inoperative. It will be readily understood that if this error occurs, the backward movement stop positions of the first and second reflecting mirror assemblies 66 and 72 deviate from their predetermined forward movement start positions. In contrast, by using the aforesaid backward movement restricting means 406, the first and second reflecting mirror assemblies 66 and 72 can be accurately stopped at the predetermined forward movement start positions. The backward restricting means 406 having the above advantage can be applied not only to variable magnification electrostatic copying apparatuses but also to single magnification electrostatic copying apparatuses permitting copying only at a 1:1 magnification, for example. It can also be applied to the accurate and stable stopping of a transparent plate in electrostatic copying apparatuses of the type in which the transparent plate is reciprocable.

In the case of the first reduction copying, the forward movement clutch $384R_1$ of the forward movement power transmission mechanism 386 is selectively operated to start the forward movement of the first and second reflecting mirror assemblies 66 and 72. After they are gradually accelerated, the first reflecting mirror assembly 66 is moved forwardly at a speed of about V/0.83, and the second reflecting mirror assembly 72 is moved forwardly at a speed of about V/2×0.82. The first movement detector 468 produces a paper conveying start signal when it detects the light shielding portion $464R_1$ of the light shielding member 464. Otherwise, the operation is the same as in the case of 1:1 ratio copying.

In the case of the second reduced copying, the forward movement clutch $384R_2$ of the forward movement power transmission mechanism 386 is selectively operated to start the forward movement of the first and second reflecting mirror assemblies 66 and 72. After they are gradually accelerated, the first reflecting mirror assembly 66 is moved forwardly at a speed of about V/0.7, and the second reflecting mirror assembly 72, at a speed of about V/2×0.7. The first movement detector 468 produces a paper conveying start signal when it detects the light shielding portion $464R_2$ of the light shielding member 464. Otherwise, the operation is the same as in the case of 1:1 ratio copying.

In the case of enlarged copying, the forward movement clutch 384E of the forward movement power transmission mechanism 386 is selectively operated to start the forward movement of the first and second reflecting mirror assemblies 66 and 72. After they are gradually accelerated, the first reflecting mirror assembly 66 is moved forwardly at a speed of about V/1.27, and the second reflecting mirror assembly 72, at a speed of about V/2×1.27. The first movement detector 468 produces a paper conveying start signal when it detects the light shielding portion 464E of the light shielding member 464. Otherwise, the operation is the same as in the case of 1:1 ratio copying.

The first movement detector 468 is releated to the light shielding portions 464N, $464R_1$, $464R_2$ and 464E of the light shielding member 464 in the following way. Let the forward movement distance of the first reflecting mirror assembly 66 from the position of the first reflecting mirror assembly 66 at the time of detecting each of the light shielding portions 464N, $464R_1$, $464R_2$ and 464E of the light shielding member 464 to the position of the first reflecting mirror assembly 66 (this position is the same in any of the 1:1 ratio copying, the first reduced copying, the second reduced copying and the enlarged copying) at the start of scanning exposure of the document be nl, $R_1l$, $R_2l$, or El respectively, the following relation holds good: $Nl \times 1/V \approx R_1l \times 0.82/V \approx R_2l \times 0.7/V \approx El \times 1.27/V$. Thus, the scanning exposure of the document is synchronized with the conveying of the copying paper as required in any of the 1:1 ratio copying, the first reduced copying, the second reduced copying and the enlarged copying.

The reed switch 480 illustrated in FIG. 6 defines the forward movement limit positions of the first and second reflecting mirror assemblies 66 and 72 in the case of the 1:1 copying, the first reduced copying, and the second reduced copying. The reed switch 482 shown in FIG. 6 defines the forward movement limit positions of the first and second reflecting mirror assemblies 66 and 72 in the enlarged copying mode. When in the 1:1 ratio copying, the first reduced copying and the second reduced copying, the first and second reflecting mirror assemblies 62 and 72 continue to move forwardly because of the inability of the paper detector 488 (FIG. 1) to produce a scanning exposure termination signal owing to paper jamming, etc. and the permanent magnet 466 provided on the upper surface of the moving member 116 reaches the position of the reed switch 480, the reed switch 480 detects it and produces a forward movement termination signal. In the case of the enlarged copying, when the first and second reflecting mirror assemblies 66 and 72 continue to move forwardly because of the inability of the paper detector 488 (FIG. 1) to produce a scanning exposure termination signal, and the permanent magnet 466 provided on the upper surface of the moving member 116 reaches the position of the reed switch 482, the reed switch 482 detects it and produces a forward movement termination signal. When the reed switch 480 or 482 produces a forward movement termination signal, any one of the forward movement clutches 384N, 384R$_1$, 384R$_2$ and 384E which has so far been operative is rendeted nonoperative to stop the forward movement of the first and second reflecting mirror assemblies 66 and 72. If desired, it is possible to render the backward movement clutch 392 operative simultaneously with, or immediately after, this, and to start the backward movement of the first and second reflecting mirror assemblies 66 and 72. The reed switch 482 which acts in the enlarged copying mode is disposed on the side of the forward movement start positions of the first and second reflecting mirror assemblies 66 and 72 by a predetermined distance from the reed switch 480 which acts in the case of the 1:1 ratio copying. This is for the following reasons.

(a) As can be seen from FIG. 1, in the case of the enlarged copying, the lens assembly 74 is moved to the side of the forward movement start positions of the first and second reflecting mirror assemblies 66 and 72, and therefore, the allowable forward moving distance of the second reflecting mirror assembly 72 (the distance over which the mirror assembly 72 can move forward without coming into collision with the lens assembly 74) becomes shorter.

(b) In the enlarged copying mode, the maximum copyable length of a document is shorter than the maximum length of a copying paper conveyed by the paper conveying mechanism 34 (they are substantially equal in the case of the 1:1 ratio copying, and the latter is longer than the former in the case of the first and second reduced copying modes), and therefore, the maximum forward movement distance required of the first and second reflecting mirror assemblies 66 and 72 is shorter.

While the present invention has been described hereinabove in detail with reference to one specific embodiment of the variable magnification electrostatic copying apparatus with reference to the accompanying drawings, it should be understood that the present invention is not limited to this specific embodiment alone, and various changes and modifications are possible without departing from the scope of the invention.

What is claimed is:

1. A variable magnification electrostatic copying apparatus comprising
    a stationary transparent plate on which to place a document to be copied,
    an optical system for projecting the image of the document onto an electrostatographic photosensitive member at a desired projecting ratio selected from a plurality of projecting ratios in an exposure zone located along the moving path of the photosensitive member, said optical system including a first reflecting mirror assembly adapted for reciprocation along the transparent plate, a second reflecting mirror assembly adapted to be reciprocated in synchronism with the reciprocation of the first reflecting mirror assembly substantially parallel to the reciprocating direction of the first reflecting mirror assembly and at a speed one-half of the moving speed of the first reflecting mirror assembly, and a lens assembly adapted to be held at any one of a plurality of positions corresponding to the plurality of projecting ratios, the changing of the projecting ratio being effected by changing the position of the lens assembly and also changing the position of the second reflecting mirror assembly relative to the first reflecting mirror assembly in the reciprocating direction of the second reflecting mirror assembly,
    a driving means for reciprocating the first and second reflecting mirror assemblies, and
    means for varying the projecting ratio of the optical system by moving the lens assembly and the second reflecting mirror assembly;
wherein said projecting ratio varying means includes a driving source, a setting member adapted to be held at any one of a plurality of positions corresponding to the projecting ratios for moving the second reflecting mirror assembly, a first drivingly linking means interposed between the driving source and the lens assembly, and a second drivingly linking means interposed between the driving source and the setting member, and when the driving source is operated, the lens assembly is moved and at the same time, the setting member is moved to move the second reflecting mirror assembly.

2. The apparatus of claim 1 wherein the first drivingly linking means comprises at least one wrapping power transmission member, and the second drivingly linking means comprises a cam and a cam follower member mounted on the setting member.

3. The apparatus of claim 2 wherein the cam is constructed of a cam plate having a plurality of arcuate positioning surfaces having different radii on its peripheral surface, the cam follower member is constructed of a follower roller rotatably mounted on the setting member, and a spring member is also provided which elastically biases the setting member to cause the follower roller to abut elastically against the cam plate.

4. The apparatus of claim 1 wherein a decelerating interlocking mechanism for moving the second reflecting mirror assembly in interlocking relation to the movement of the first reflecting mirror assembly is disposed between the first reflecting mirror assembly and the second reflecting mirror assembly of the optical system; the decelerating interlocking mechanism comprises a pair of stationary pulleys rotatably mounted with a space therebetween in the reciprocating direction of the first and second reflecting mirror assemblies, a movable pulley mounted rotatably on the second reflecting mirror assembly, and a rope wrapped about the pair of stationary pulleys and the movable pulley and fixed to the first reflecting mirror assembly; and the two free ends of the rope are wrapped about the movable pulley in mutually opposite directions and then linked to the setting member, and when the setting member is moved, the movable pulley correspondingly moves to move the second reflecting mirror assembly.

5. The apparatus of claim 4 wherein the setting member has a pair of linking portions located on opposite sides of the movable pulley as viewed in the reciprocating direction of the second reflecting mirror assembly, and the two free ends of the rope are linked respectively to the pair of linking portions.

6. The apparatus of claim 1 wherein the first drivingly linking means includes a driven wheel and a follower wheel rotatably mounted with a space therebetween in the moving direction of the lens assembly, an endless wrapping power transmission member wrapped about the driven wheel and the follower wheel, an interlocking projection set up firmly in the wrapping power transmission member, an interlocking member adapted to be engaged with the interlocking projection and moved incident to the movement of the interlocking projection, a driven member provided in the lens assembly, an interlocking spring member interposed between the interlocking member and the driven member for elastically biasing the interlocking member to an interlocking relation position relative to the driven member, an abutting projection provided in the lens assembly, and a position setting means having a plurality of stop portions corresponding respectively to the plurality of positions of the lens assembly which correspond to projecting ratios; and wherein when the driving source is operated to drive the endless wrapping power transmission member, the motion of the wrapping power transmission member is transmitted to the driven member through the interlocking projection, the interlocking member and the interlocking spring means to move the lens assembly, and when the abutting projection abuts against any one of the plurality of stop portions, the movement of the lens assembly is hampered, whereupon by the motion transmitted from the wrapping power transmission member to the interlocking member through the interlocking projection, the interlocking member is displaced from the interlocking relation position with respect to the driven member against the elastic biasing action of the interlocking spring member.

7. The apparatus of claim 6 wherein the position setting means has stop portions located at opposite ends of the moving path of the abutting projection and at least one intermediate stop portion located between the two opposite ends of the moving path of the abutting projection, and is mounted for free movement between an operating position at which the intermediate stop portion can hamper the movement of the abutting projection and a releasing position at which the intermediate stop portion cannot hamper the movement of the abutting projection, and wherein there are further provided a spring member for elastically biasing the position setting means to said operating position and a release means for moving the position setting means to said releasing position against the elastic biasing action of the spring member.

8. The apparatus of claim 7 wherein the release means is constructed of a releasing projection provided in the interlocking member, and when the interlocking member is displaced from the interlocking relation position with respect to the driven member beyond a predetermined range as a result of the abutting projecting abutting against the intermediate stop portion of the position setting means, the releasing projection acts on the position setting means to move it from the operating position to the releasing position.

9. The apparatus of claim 6 wherein the wrapping power transmission member has a pair of linear running portions extending substantially parallel to the moving direction of the lens assembly; and an engaging slot extending substantially at right angles to, and across, the pair of linear running sections of the wrapping power transmission member is formed in the interlocking member; and by inserting the interlocking projection into the engaging slot, the interlocking member comes into engagement with the interlocking projection.

10. The apparatus of claim 6 wherein the driven member has a first and a second linking projections spaced from each other laterally with respect to the moving direction of the lens assembly; the interlocking member has formed therein a first and a second linking slots for receiving the first and second linking projections respectively; the first linking slot extends in an arcuate shape about the second linking projection as a center, and the second linking slot extends in an arcuate shape about the first linking projection as a center; in said interlocking relation position, the first and second linking projections are positioned at one ends of the first and second linking slots respectively; and the interlocking member can be pivotally displaced from the interlocking relation position about the first linking projection as a center and about the second linking projection as a center.

11. The apparatus of claim 6 wherein when the lens assembly and the second reflecting mirror assembly of the optical system are to be moved to selected projecting ratio positions, the operation of the driving source is stopped after the lapse of some time from the time when the abutting projection has abutted against a specified stop portion of the position setting means which corresponds to the selected projecting ratio position, whereby the driving of the wrapping power transmission member is stopped while the interlocking member is displaced to some extent from the interlocking relation position, and thus the lens assembly is elastically held by the interlocking spring member at that position at which the abutting projection has abutted against the specified stop portion.

12. The apparatus of claim 11 wherein the driving source is constructed of a reversible electric motor, and when the operation of the motor is to be stopped, a reversing current is instantaneously supplied to the motor to apply a braking action to the motor.

13. The apparatus of claim 11 wherein a detection plate adapted for rotation according to the operation of the driving source and a detector for detecting the amount of rotation of the detection plate are provided, and the operation of the driving source is controlled on the basis of the amount of rotation of the detection plate from a specified angular position corresponding to a specified projecting ratio position selected from the plurality of the projecting ratio positions.

14. The apparatus of claim 13 wherein the specified projecting ratio position is a 1:1 ratio projecting position.

15. The apparatus of claim 1 wherein the driving means for reciprocating the first and second reflecting mirror assemblies includes a main driving source, a plurality of forward movement clutch means disposed between the main driving source and the first and second reflecting mirror assemblies, said clutch means being adapted to be operated selectively according to the plurality of projecting ratios and to move the first and second reflecting mirror assemblies forwardly at speeds corresponding respectively to the plurality of the projecting ratios, a backward movement clutch means interposed between the main driving source and the first and second reflecting mirror assemblies for moving the first and second reflecting mirror assemblies at predetermined speeds, and a backward movement restricting means for stopping the backward movement of the first and second reflecting mirror assemblies fully accurately at predetermined forward movement start positions; and the backward movement restricting means includes a one-way clutch having a plurality of engaging pawls on its peripheral surface and interposed between the backward movement clutch means and the first and second reflecting mirror asemblies, a clutch control member freely movable between its engaging position at which it engages one of the plurality of engaging pawls of the one-way clutch to render the one-way clutch inoperative and its non-engaging position at which it disengages from the engaging pawl of the one-way clutch and renders the one-way clutch operable, a spring member for elastically biasing the clutch control means to the non-engaging position, and an actuating piece which moves together with the first and second reflecting mirror assemblies, and when the first and second reflecting mirror assemblies reach the forward movement start positions, brings the clutch control member mechanically to said engaging position against the elastic biasing action of the spring member.

16. The apparatus of claim 15 wherein each of the forward movement clutch means and the backward movement clutch means are constructed of electromagnetic clutches.

17. The apparatus of claim 15 wherein the driving means further includes a pair of wheels rotatably mounted with a space therebetween in the reciprocating directions of the first and second reflecting mirror assemblies, an endless wrapping power transmission member wrapped about the pair of wheels, an interlocking projection set up firmly in the endless wrapping power transmission member, an driven member provided in the first reflecting mirror assembly and engaged with the interlocking projection for moving the first reflecting mirror assembly incident to the movement of the interlocking projection, and a deceleration interlocking mechanism for moving the second reflecting mirror assembly in interlocking relation to the movement of the first reflecting mirror assembly; and the output side of each of the forward movement clutch means is drivingly connected to one of the wheels in pair and the output side of the one-way clutch is drivingly connected to the other wheel.

18. The apparatus of claim 17 wherein the actuating piece is mounted on the wrapping power transmission member.

19. A variable magnification electrostatic copying apparatus comprising
a transparent plate on which to place a document to be copied,
an optical system for projecting the image of the document on an electrostatographic photosensitive member at a desired projecting ratio selected from a plurality of projecting ratios in an exposure zone located along the moving path of the photosensitive member, said optical system containing at least one position-variable optical element assembly adapted to be positioned at any one of a plurality of positions corresponding to the plurality of projecting ratios,
a driving means for moving at least a part of the optical system and the transparent plate relative to each other, and
means for varying the projecting ratio of the optical system by moving said position-variable optical element assembly;
wherein said projecting ratio varying means includes a driving source, a driven wheel and a follower wheel rotatably mounted with a space therebetween in the moving direction of the position-variable optical element assembly, an endless wrapping power transmission member wrapped about the driven wheel and the follower wheel, an interlocking projection set up firmly in the wrapping power transmission member, an interlocking member adapted to be engaged with the interlocking projection and moved incident to the movement of the interlocking projection, a moving member provided in the position-variable optical element assembly, an interlocking spring member interposed between the interlocking member and the driven member for elastically biasing the interlocking member to an interlocking relation position relative to the driven member, an abutting projection provided in the position-variable optical element assembly, and a position setting means having a plurality of stop portions corresponding to said plurality of positions of the position-variable optical element assembly which correspond to the projecting ratios; and wherein when the driving source is operated to drive the endless wrapping power transmission member, the motion of the wrapping power transmission member is transmitted to the driven member through the interlocking projection, the interlocking member and the interlocking spring member to move the position-variable optical element assembly, and when the abutting projection abuts against any one of the plurality of stop portions, the movement of the position-variable optical element assembly is hampered, whereupon by the motion transmitted from the wrapping power transmission member to the interlocking member through the interlocking projection, the interlocking member is displaced from the interlocking relation position with respect the the driven member against the elastic biasing action of the interlocking spring member.

20. The apparatus of claim 19 wherein the position setting means has stop portion located at opposite ends of the moving path of the abutting projection and at least one intermediate stop portion located between the two opposite ends of the moving path of the abutting projection, and is mounted for free movement between an operating position at which the intermediate stop portion can hamper the movement of the abutting projection and a releasing position at which the intermediate stop portion cannot hamper the movement of the abutting projection, and wherein there are further provided a spring member for elestically biasing the position setting means to said operating position and a release means for moving the position setting means to said releasing position against the elastic biasing action of the spring member.

21. The apparatus of claim 20 wherein the release means is constructed of a releasing projection provided in the interlocking member, and when the interlocking member is displaced from the interlocking relation position with respect to the driven member beyond a predetermined range as a result of the abutting projection abutting against the intermediate stop portion of the position setting means, the releasing projection acts on the position setting means to move it from the operating position to the releasing position.

22. The apparatus of claim 19 wherein the wrapping power transmission member has a pair of linear running sections extending substantially parallel to the moving direction of the position-variable optical element assembly; and an engaging slot extending substantially at right angles to, and across, the pair of linear running sections of the wrapping power transmission member is formed in the interlocking member; and by inserting the interlocking projection into the engaging slot, the interlocking member comes into engagement with the interlocking projection.

23. The apparatus of claim 19 wherein the driven member has a first and a second linking projections spaced from each other laterally with respect to the moving direction of the position-variable optical element assembly; the interlocking member has formed therein a first and a second linking slots for receiving the first and second linking projections respectively; the first linking slot extends in an arcuate shape about the second linking projection as a center, and the second linking slot extends in an arcuate shape about the first linking projection as a center; in said interlocking relation position, the first and second linking projections are positioned at one ends of the first and second linking slots respectively; and the interlocking member can be pivotally displaced from the interlocking relation position about the first linking projection as a center and about the second linking projection as a center.

24. The apparatus of claim 19 wherein when the position-variable optical element assembly is to be moved to a selected projection ratio position, the operation of the driving source is stipped after the lapse of some time from the time when the abutting projection has abutted against a specified stop portion of the position setting means which corresponds to the selected projection ratio position, whereby the driving of the wrapping power transmission member is stopped while the interlocking member is displaced to some extent from the interlocking relation position, and thus the position-variable optical element assembly is elastically held by the interlocking spring member at that position at which the abutting projection has abutted against the specified stop portion.

25. The apparatus of claim 24 wherein the driving source is constructed of a reversible electric motor, and when the operation of the motor is to be stopped, a reversing current is instantaneously supplied to the motor to apply a braking action to the motor.

26. The apparatus of claim 24 wherein a detection plate adapted for rotation according to the operation of the driving source and a detector for detecting the amount of rotation of the detection plate are provided, and the operation of the driving source is controlled on the basis of the amount of rotation of the detection plate from a specified angular position corresponding to a specified position selected from the plurality of the projecting ratio positions.

27. The apparatus of claim 26 wherein the specified projecting ratio position is a 1:1 ratio projecting position.

28. An electrostatic copying apparatus comprising
a transparent plate on which to place a document to be copied,
an optical system for projecting the image of the document onto an electrostatographic photosensitive member in an exposure zone located along the moving path of the photosensitive member, and
a driving means for reciprocating one of at least a part of the optical system and the transparent plate, said driving means including a main driving source, at least one forward movement clutch interposed between the main driving source and said one of at least a part of the optical system and the transparent plate for moving said one of at least a part of the optical system and the transparent plate forward, and a backward movement clutch interposed between the main drive source and said one of at least a part of the optical system and the transparent plate for moving said one of at least a part of the optical system and the transparent plate backward; wherein said driving means further includes a backward movement restricting means for stopping the backward movement of said one of at least a part of the optical system and the transparent plate fully accurately at a predetermined forward movement start position, and said backward movement restricting means includes a one-way clutch having a plurality of engaging pawls on its peripheral surface and interposed between the backward movement clutch means and said one of at least a part of the optical system and the transparent plate, a clutch control member freely movable between its engaging position at which it engages one of the plurality of engaging pawls of the one-way clutch to render the one-way clutch inoperative and its non-engaging position at which it disengages from the engaging pawl of the one-way clutch and renders the one-way clutch operable, a spring member for elastically biasing the clutch control member to the non-engaging position, and an actuating piece which moves together with said one of at least a part of the optical system and the transparent plate, and when said one of at least a part of the optical system and the transparent plate reaches the forward movement start position, brings the clutch control member mechanically to said engaging position against the elastic biasing action of the spring member.

29. The apparatus of claim 28 wherein the forward movement clutch means and the backward movement clutch means are constructed of electromagnetic clutches.

30. The apparatus of claim 28 wherein the driving means further includes a pair of wheels rotatably mounted with a space therebetween in the reciprocating direction of said one of at least a part of the optical system and the transparent plate, an endless wrapping power transmission member wrapped about the pair of wheels, an interlocking projection set up firmly in the endless wrapping power transmission member, and a driven member provided in said one of at least a part of the optical system and the transparent plate and engaged with the interlocking projection for moving said one of at least a part of the optical system and the transparent plate incident to the movement of the interlocking projection; and wherein the output side of each of said forward movement clutch means is drivingly connected to one of the wheels in pair, and the output side of the one-way clutch is drivingly connected to the other wheel.

31. The apparatus of claim 30 wherein the actuating piece is mounted on the wrapping power transmission member.

* * * * *